US010933648B2

(12) United States Patent
Anderson et al.

(10) Patent No.: US 10,933,648 B2
(45) Date of Patent: Mar. 2, 2021

(54) DETECTING FLUID LEVELS USING A COUNTER

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US); Berkeley Fisher, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,101

(22) PCT Filed: Apr. 29, 2016

(86) PCT No.: PCT/US2016/030257
§ 371 (c)(1),
(2) Date: Oct. 16, 2018

(87) PCT Pub. No.: WO2017/189013
PCT Pub. Date: Nov. 2, 2017

(65) Prior Publication Data
US 2019/0111695 A1 Apr. 18, 2019

(51) Int. Cl.
B41J 29/38 (2006.01)
B41J 2/175 (2006.01)
G01F 23/24 (2006.01)
(52) U.S. Cl.
CPC ......... B41J 2/17566 (2013.01); B41J 2/1753 (2013.01); B41J 2/17546 (2013.01);
(Continued)

(58) Field of Classification Search
CPC .................................. B41J 2/175; B41J 2/195
See application file for complete search history.

(56) References Cited

U.S. PATENT DOCUMENTS 4,326,199 A * 4/1982 Tarpley ............... G08B 21/182
                                                             137/386
4,590,797 A * 5/1986 Beaubatie ............ G01F 23/246
                                                             137/392

(Continued)

FOREIGN PATENT DOCUMENTS

CN        1791513        6/2006
CN      101269580        9/2008
(Continued)

OTHER PUBLICATIONS

European Patent Office, "Extended European Search Report," issued in connection with EP patent application No. 16900746.5, dated Oct. 10, 2019, 11 pages.

(Continued)

Primary Examiner — Lam S Nguyen
(74) Attorney, Agent, or Firm — Hanley Flight & Zimmerman LLC

(57) ABSTRACT

An example printing cartridge includes a fluid container, a plurality of sensing locations in thermal contact with the fluid container, a voltage comparator to output time-based information based on a comparison of a sensed voltage generated at a selected sensing location of the plurality of sensing locations to a threshold voltage, the time-based information representative of whether a fluid is present at a fluid level associated with the selected sensing location, and a counter to convert the time-based information to a digital code based on a number of clock cycles.

19 Claims, 13 Drawing Sheets

(52) U.S. Cl.
CPC ........ *B41J 2/17553* (2013.01); *G01F 23/246* (2013.01); *B41J 2002/17579* (2013.01)

(56) References Cited

U.S. PATENT DOCUMENTS

| | | | |
|---|---|---|---|
| 5,721,573 | A | 2/1998 | Benjamin |
| 6,098,457 | A | 8/2000 | Poole |
| 6,871,926 | B2 | 3/2005 | Adkins et al. |
| 8,562,091 | B2 | 10/2013 | Sabanovic et al. |
| 9,233,550 | B2 | 1/2016 | Aida |
| 9,452,604 | B2 | 9/2016 | Van Brocklin et al. |
| 9,487,017 | B2 | 11/2016 | Ge et al. |
| 9,925,787 | B2 | 3/2018 | Van Brocklin et al. |
| 10,308,035 | B2 | 6/2019 | Van Brocklin et al. |
| 2004/0207668 | A1 | 10/2004 | Adkins et al. |
| 2005/0120791 | A1 | 6/2005 | Carlson et al. |
| 2005/0262938 | A1 | 12/2005 | Carlson et al. |
| 2008/0231651 | A1 | 9/2008 | Jung |
| 2010/0192685 | A1 | 8/2010 | Sabanovic et al. |
| 2010/0295884 | A1 | 11/2010 | Smektala |
| 2011/0221802 | A1 | 9/2011 | Sabanovic et al. |
| 2014/0085363 | A1 | 3/2014 | Van Brocklin et al. |
| 2015/0062232 | A1 | 3/2015 | Aida |
| 2015/0273848 | A1 | 10/2015 | Ge et al. |
| 2016/0375691 | A1 | 12/2016 | Van Brocklin et al. |
| 2017/0028738 | A1 | 2/2017 | Ghozeil et al. |
| 2018/0162137 | A1 | 6/2018 | Van Brocklin et al. |
| 2018/0297370 | A1 | 10/2018 | Ghozeil et al. |

FOREIGN PATENT DOCUMENTS

| | | |
|---|---|---|
| CN | 102205726 | 10/2011 |
| CN | 103702838 | 4/2014 |
| CN | 104417052 | 3/2015 |
| EP | 1074390 | 2/2001 |
| KR | 1020080086078 | 9/2008 |
| WO | 2015116092 | 8/2015 |

OTHER PUBLICATIONS

Chinese Patent Office, "Office action," issued in connection with Chinese patent application No. 201680085106.3, dated Sep. 4, 2019, 5 pages. English translation not available.

International Searching Authority, "Search Report," issued in connection with PCT patent application No. PCT/US2016/030257, dated Jan. 19, 2017, 3 pages.

International Searching Authority, "Written Opinion," issued in connection with PCT patent application No. PCT/US2016/030257, dated Jan. 19, 2017, 4 pages.

Englund et al., "A SOM-based data mining strategy for adaptive modelling of an offset lithographic printing process," published in Engineering Applications of Artificial Intelligence, vol. 20, Issue 3, Apr. 2007, retrieved from https://dl.acm.org/citation.cfm?id=1230542, on Oct. 16, 2018, 2 pages.

\* cited by examiner

DETECTING FLUID LEVELS USING A COUNTER

RELATED APPLICATION

This patent arises from the U.S. national stage of International Patent Application Serial No. PCT/US2016/030257, having an international filing date of Apr. 29, 2016, and which is hereby incorporated by reference in its entirety for all purposes.

BACKGROUND

Inkjet printing devices include print heads having a number of nozzles. The nozzles are used to eject fluid (e.g., ink) onto a substrate to form an image. The nozzles are generally arranged to include at least one column or array such that a properly sequenced ejection of fluid from nozzles may cause characters, symbols, and/or other graphics or images to be printed on the substrate as the print head and the substrate are moved relative to each other. Some print heads include integrated fluid level sensors to sense a level of the fluid in the print head. For example, known print heads may use electrodes to determine fluid levels by measuring the resistance of the fluid on the electrodes.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
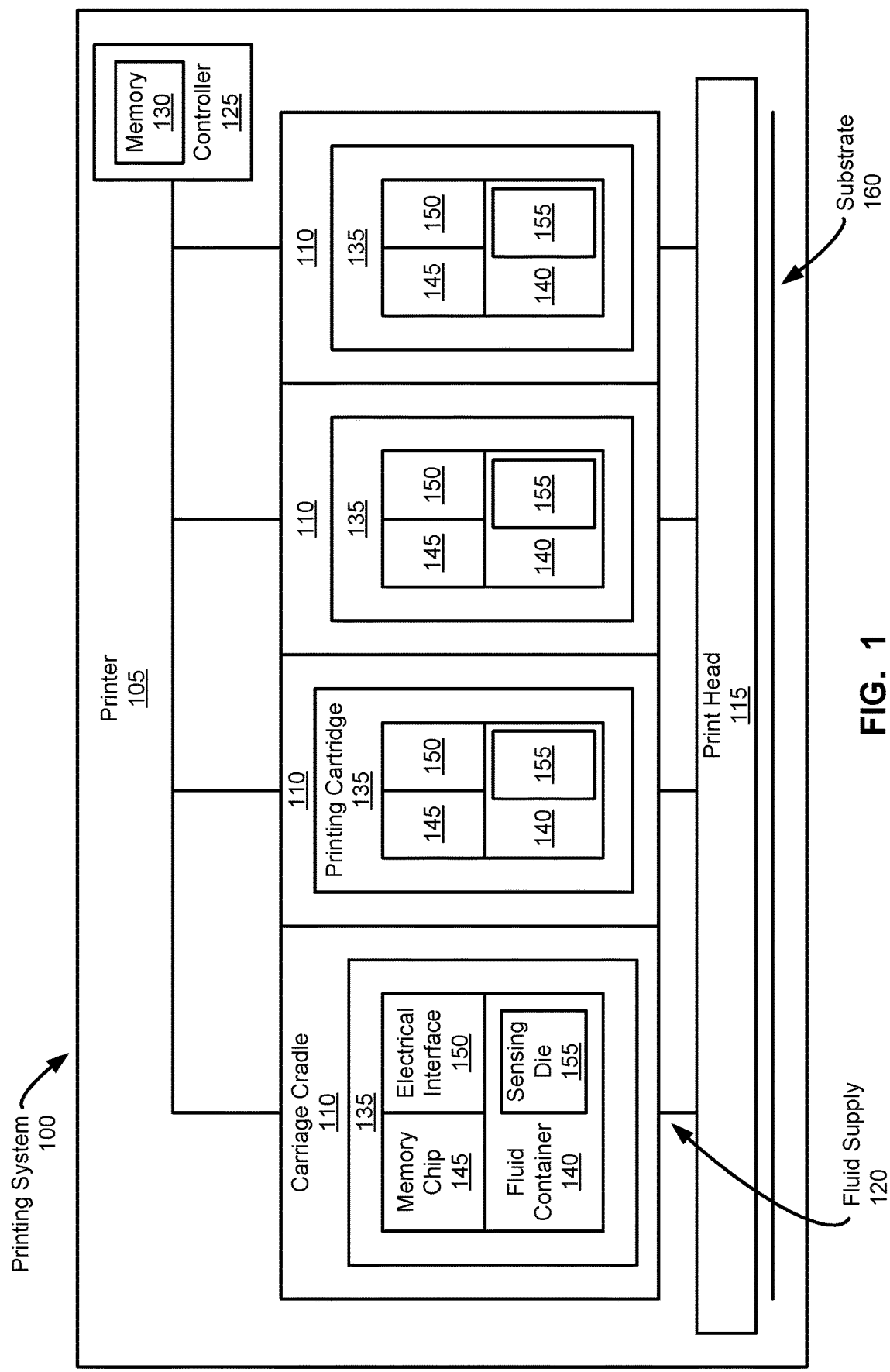
FIG. 1 illustrates a schematic view of an example fluid ejecting system that can be used to implement the examples disclosed herein.

A printing cartridge may include electrical contacts and a fluid container. In some examples, the printing cartridge interfaces with at least one print head through a carriage cradle of a printer to facilitate printing. In some examples, the printing cartridge may include at least one print head housed together in a replaceable device such as an integrated printing cartridge.

The fluid container may store one color of ink. Also, a number of fluid containers may each store a different color of ink. In other examples, such as when used in 3D printing, the fluid container may store a fusing agent or a detailing agent (e.g., water). The printing cartridge may be removed, replaced and/or refilled. Electrical contacts carry electrical signals to and from a controller, for example, to control fluid drop generators in the print heads to eject fluid drops through nozzles and to make fluid level measurements. Some known printing cartridges utilize a silicon die as a sensing device to make fluid level measurements. However, in many instances silicon is relatively expensive. Some known printing cartridges utilize electrodes embedded in a die to measure fluid level by measuring the resistance of the fluid on the electrodes.

The controller may control the print heads for ejection of fluid drops from nozzles, for example, by defining a pattern of ejected fluid drops that form characters, symbols and/or other graphics or images on a print medium. The pattern of ejected fluid drops may be determined by print job commands and/or command parameters from a data source.

The level of fluid available in the fluid container may be determined for a number of reasons—for example, to determine an appropriate time for replacement of the cartridge and to avoid premature replacement of the cartridge. In some example implementations of the present subject matter, a sensing die is provided to the cartridge to measure the level of fluid available in the fluid container. The sensing die uses a comparator to convert a temperature decay rate at a sensing location in the sensing die into a time-based signal that can be used to sense the presence of fluid near the sensing location. In the example implementations, the sensing die includes a plurality of heating elements and sensing elements associated with respective fluid levels in the fluid container. In some example implementations of the present subject matter, when a fluid level measurement request is received, a heating event is initiated on the sensing die. For example, an electrical interface provided to the cartridge may cause a particular heating element to emit a heat pulse. A sensing element positioned at or near the sensing location converts the temperature at the sensing location into a sensed voltage. As the temperature at the sensing location decays over time (e.g., after the heating event is stopped), the value of the sensed voltage also decays. The rate at which the temperature and the sensed voltage decays varies based on the type of fluid that borders the sensing element and/or the heating element. For example, a liquid such as ink will thermally conduct heat at a faster rate relative to air.

A comparator positioned on the sensing die compares the sensed voltage to a voltage threshold and outputs a digital signal indicating which is larger. In some example implementations of the present subject matter, the comparator is an analog-to-digital converter. For example, when the sensed voltage satisfies the voltage threshold (e.g., the value of the sensed voltage is greater than or equal to the voltage threshold), an output of the comparator flips from a first state (e.g., a logical high value indicative of when the sensed voltage satisfies the voltage threshold) to a second state (e.g., a logical low value indicative of when the sensed voltage does not satisfy the voltage threshold). The time it takes for the output of the comparator to flip from the first state to the second state may be used to determine whether the sensing location is bordered by air or a liquid and used to sense the presence of fluid near the sensing location of the cartridge. As noted above, the temperature decay rate varies based on the contents of the fluid container. The contents of the fluid container may be all ink (e.g., a filled ink container), ink and air (e.g., a partially-filled ink container), just air (e.g., an empty ink container), or an agent (e.g., a 3D printing agent). Thus, the temperature decay rate at each sensing location may change with the level of fluid in the fluid container and provides an indication of the level of fluid in the fluid container. In some example implementations of the present subject matter, by identifying at which sensing location on the sensing die the temperature decay rate changes significantly (e.g., greater than or equal to a threshold rate change), the sensing location where presence of a fluid (e.g., ink) transitions from present to not present is identified and, therefore, the level of fluid in the fluid container is determined. In some examples, the on-die controller communicates the level of fluid in the fluid container via digital signals.

In some example implementations of the present subject matter, the sensing die includes a plurality of sensing locations. The granularity of the fluid level measurement depends on the number of sensing locations in the sensing die. For example, if a sensing die includes five, evenly-spaced sensing locations, the fluid level measurements are provided in twenty percent intervals. In some example implementations of the present subject matter, a sensing location includes a heating element to heat the sensing die at the sensing location and a sensing element to convert the temperature of the sensing die at (or substantially near (e.g., within ten micrometers) the sensing location into a voltage. Each heating element/sensing element pair is coupled to an element manager to control which heating element/sensing element pair is active at a time. In some implementations, the element manager is a multiplexer.

In an example implementation of the present subject matter, the output of the comparator is provided to the electrical interface, which records flipping times for a plurality of sensing locations. The electrical interface may compare the recorded flipping times to determine when the liquid in the fluid container transitions from a first fluid (e.g., air) to a second fluid (e.g., ink). In some example implementations of the present subject matter, the sensing die is provided a counter. In some such examples, the output of the comparator is provided to the counter, which counts a number of clock periods before the comparator output transitions from the first state to the second state.

In some example implementations of the present subject matter, the threshold voltage applied by the comparator is a fixed value. For example, the comparator may compare the sensed voltage to a four volt threshold. In some such implementations, a first flipping time (or a first range of times) may be associated with air and a second flipping time (or a second range of times) may be associated with ink. In some example implementations of the present subject matter, the threshold voltage applied by the comparator may be a variable that is sent for different heating events. In some such implementations, the same flipping time (or range of times) may correspond to air for a first threshold voltage and may correspond to link for a second threshold voltage.

The present subject matter describes fluid level sensing apparatus and methods including a sensing die having a plurality of sensing locations including a heating element, a sensing element and an element manager, and a voltage comparator. The fluid level sensing apparatus and methods of the present subject matter reduce the size of a fluid level sensing apparatus integrated with a fluid container, thereby saving cost. The fluid level sensing apparatus and methods of the present subject matter also facilitate a simple communication protocol that reduces silicon area and cost. Furthermore, the present subject matter describes communicating between the printer and the sensing die via digital signals, which are relatively more immune to electronic noise than analog signals. Moreover, by using timing information (e.g., temperature decay rates) rather than communicating whether fluid is present using simple on/off signals, fluid level information is securely transmitted off the sensing die and reduces the likelihood of intercepting and interpreting fluid level information.

The circuitry on the sensing die facilitates as many sensing locations as fluid levels to be detected. For example, the sensing die may include 100 sensing locations to provide fluid level measurements in one percent increments, may include 20 sensing locations to provide fluid level measurements in five percent increments, etc. Each sensing location is associated with a heating element that provides (e.g., emits) a heat pulse to the sensing location, a sensing element that converts the temperature into a voltage and an element manager to select when the sensing location is active (e.g., the heating pulse is applied and the sensing element outputs a sensed voltage).

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 is a block diagram of an example printing system 100 that can be used to implement the teachings of this disclosure. The example printing system 100 of FIG. 1 includes an example printer 105, example carriage cradles 110 and example printing cartridges 135. In an example implementation, the printer 105 is an inkjet printer (e.g., a thermal inkjet printer, a piezo inkjet printer, a continuous inkjet printer, etc.). In some examples, the printer 105 is a 3D printer used to print three-dimensional objects.

The example printer 105 of FIG. 1 includes at least one carriage cradle 110 to receive and exchange at least one corresponding printing cartridge 135. The carriage cradles 110 are arranged to establish a fluidic interface between the printing cartridges 135 and a print head 115 via a fluid supply 120. The example printer 105 of FIG. 1 includes four carriage cradles 110. However, other implementations may use any other number of carriage cradles 110. In an example implementation, the print head 115 is a page-wide array print head. However, other types of print heads, such as a scanning print head, may be used, alone or in combination with the aforedescribed print heads. During a print operation, a substrate 160 (e.g., paper) extends under the print head 115. In some examples, the printer 105 may move the carriage cradle 110 over the substrate 160.

In an example implementation, the printer 105 is provided with a controller 125 including a memory 130. The controller 125 may retrieve and execute executable code from the memory 130. For example, the controller 125 may execute executable code to cause a power supply unit to provide power to the example print head 115. The memory 130 may include a variety of information such as an identifier of the printer 105, an identifier of printing cartridges 135 that may be used with the printer 105, calibration data, error information, etc.

The example printing cartridges 135 of FIG. 1 include a fluid container 140, a memory chip 145 and an electrical interface 150. The carriage cradles 110 are arranged to connect the fluid containers 140 to the print head 115 through the fluid supply 120. In an example implementation, each printing cartridge 135 may include a different fluid in the respective fluid containers 140. For example, if the printer 105 is an inkjet printer, the fluid in each fluid container 140 may include ink of a specific color (e.g., a cyan color, a magenta color, a yellow color, a black color and/or gray color, etc.). In another example, if the printer 105 is a 3D printer, the fluid in each fluid container 140 may be an agent such as a fusing agent or a detailing agent (e.g., water). The printing cartridges 135 of FIG. 1 are arranged to be exchanged with respect to the corresponding carriage cradle 110.

The memory chip 145 of the printing cartridges 135 may include a variety of information such as an identifier of the type of printing cartridge 135, an identification of the kind of fluid contained in the fluid container 140, calibration data, error information and/or other data. In some examples, the memory chip 145 includes information indicating when the respective printing cartridge 135 should receive maintenance. In some examples, the printer 105 can take appropriate action based on the information contained in the memory chip 145, such as altering printing routines to maintain image quality.

In an example implementation, the controller 125 may retrieve data from the electrical interface(s) 150. For example, the controller 125 may request the electrical interface(s) 150 provide cartridge characteristics such as product characteristics, fluid quantity characteristics, fluid type characteristics, etc.

In some examples, the printing cartridges 135 may include an integrated print head. For example, the print head 115, the fluid supply 120 and the fluid container 140 may be housed together in a replaceable device such as an integrated printing cartridge. In some implementations, the print head 115 and the fluid container 140 may be positioned in separate housing (sometimes referred to as an "individual ink container").

To make fluid level measurements, the printing cartridges 135 are provided an example sensing die 155. The example sensing die 155 includes a plurality of sensing locations to detect presence of fluids within the fluid container 140 and to communicate the fluid levels (e.g., to the controller 125 and/or the electrical interface 155). The example sensing die 155 facilitates sensing fluid level information upon receipt of a fluid level measurement request. When a fluid level request is received at the sensing die (e.g., from the controller 125 and/or the electrical interface 150), a sensing location on the sensing die 155 is selected and a heat pulse is emitted by the corresponding heating element (e.g., a resistor). In response to the heat pulse, the sensing die 155 heats-up at the sensing location. At the end of the heat pulse, a cooling period begins and the temperature at the sensing location begins to cool. The sensing element (e.g., a sensor such as a diode, a resistor, etc.) at (or near) the sensing location converts the temperature into a sensed voltage, which is provided to a voltage comparator included in the sensing die 155. The voltage comparator compares the sensed voltage to a threshold voltage and outputs a first value (e.g., a logical high value) when the sensed voltage satisfies the threshold voltage, and the voltage comparator outputs a second value (e.g., a logical low value) when the sensed voltage does not satisfy the threshold voltage. In some example implementations of the present subject matter, the electrical interface 150 monitors the output of the voltage comparator and determines a temperature decay rate based on when the cooling period was initiated and when the output of the comparator changed from the first value to the second value. The electrical interface 150 and/or the controller 125 may then transmit a heat pulse to another sensing location until temperature delay rates for at least a portion of the sensing locations are determined. By identifying at which sensing location on the sensing die 155 the temperature decay rate changes significantly, the electrical interface 150 and/or the controller 125 identifies the sensing location where presence of a fluid (e.g., ink) transitions from present to not present and, therefore, the level of fluid in the fluid container 140.

Figure 2:
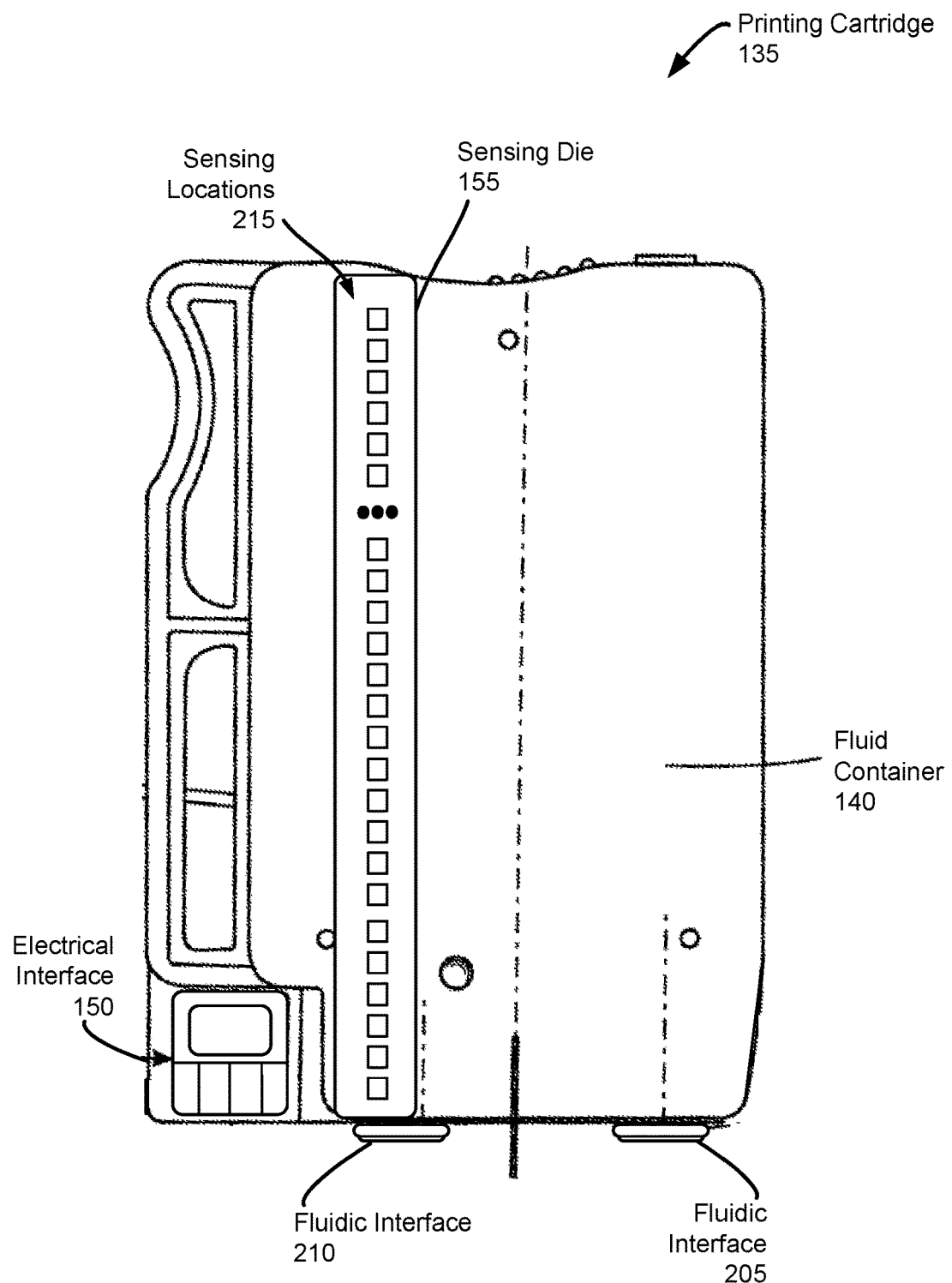
FIG. 2 illustrates a schematic view of an example printing cartridge that can be used with the example fluid ejecting system of FIG. 1 to implement the examples disclosed herein.

FIG. 2 is a block diagram of an example printing cartridge 135 that can be used with the example printing system 100 of FIG. 1. In this example, the printing cartridge 135 includes the example fluid container 140, the example electrical interface 150, example fluidic interfaces 205, 210 and the example sensing die 155 including a plurality of sensing locations 215.

The example fluidic interfaces 205, 210 establish a fluidic connection with the printer 105 (FIG. 1). For example, the first fluidic interface 205 may be a seal ring (e.g., a socket) to receive a fluid pen extending from the carriage cradle 110 (FIG. 1). In an example implementation, the first fluidic interface 205 may guide a print fluid, such as ink, from the fluid container 140 to the carriage cradle 110. During a print operation, the printing system 100 prints by retrieving the first fluid (e.g., a print fluid) from the ink container 140 via the first fluidic interface 205.

The second fluidic interface 210 may facilitate transporting a gas, such as air, to and from the fluid container 140, for example, to implement pressure control inside the fluid container 140. The gas may be ambient air. In an example implementation, the second fluid interface 210 may be connected to a pressure bag located within the fluid container 140.

To make fluid level measurements, the printing cartridge 135 includes the example sensing die 155. In the illustrated example, the sensing die 155 is made of silicon and is in contact with the fluid container 140 from the top to the bottom of the fluid container 140. The example sensing die 155 includes a plurality of sensing locations 215 to sense fluid levels within the fluid container 140 and to communicate the fluid levels, for example, to the controller 125 of FIG. 1. The example sensing locations 215 include a heating element to emit a heat pulse and a sensing element positioned at or near the heating element to convert a temperature to a sensed voltage. The sensing locations 215 also include an element manager to control when the respective sensing location 215 is active. For example, the element manager controls which heating element emits a heat pulse and the sensed voltage that is recorded to detect presence of fluid in the fluid container 140.

A passivation layer between the sensing die 155 and the fluid container 140 may prevent contact between the sensing locations 215 and the fluid being sensed. In some example implementations, the passivation layer protects the heating elements and the sensing elements associated with each sensing location 215 from damage that may occur from corrosive contact with the fluid (e.g., ink) being sensed. In some implementations, the passivation layer may include silicon carbide and/or tetraethyl orthosilicate (TEOS). However, other materials for forming the passivation layer may be used, alone or in combination with the aforedescribed materials. In some implementations, the sensing die 155 may omit the passivation layer.

A voltage comparator provided to the sensing die 155 compares the sensed voltage to a threshold voltage and the flipping time (e.g., the interval measured between when the heat pulse is emitted and when the sensed voltage does not satisfy the threshold voltage) is used to detect the presence of fluid at the sensing location. In some implementations, the output of the voltage comparator is transmitted from the sensing die 155 to the electrical interface 150 and/or the controller 125. In some implementations, the output of the voltage comparator is converted to a digital code representative of the flipping time and then transmitted from the sensing die 155 to the electrical interface 150 and/or the controller 125. In some examples, the electrical interface 150 may process the fluid level information prior to transmitting the information to the controller 125. For example, the electrical interface 150 may generate a signal based on the flipping times provided by the sensing die 155. The electrical interface 150 may communicate the signal to the controller 125 via an electrical connection established with the printer 105 through the carriage cradle 110.

The number of sensing locations 215 included in the sensing die 155 varies based on the desired granularity of the fluid level measurements. For example, one hundred sensing locations 215 may be positioned in the sensing die 155 so that each sensing location 215 corresponds to one percent fluid-filled increments. However, other implementations may use any other number of sensing locations 215.

Figure 3:
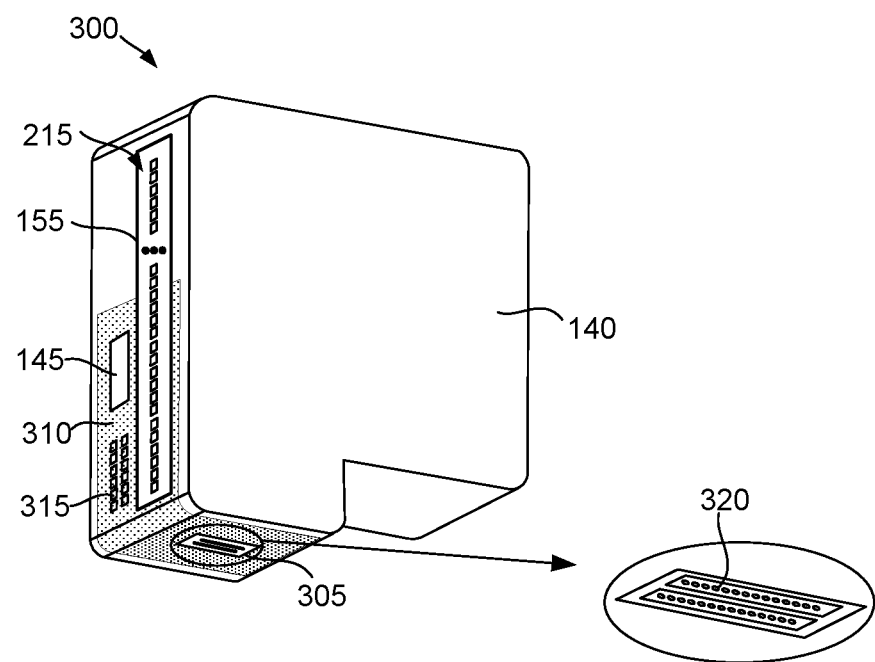
FIG. 3 illustrates a schematic view of another example printing cartridge that can be used to implement the examples disclosed herein.

FIG. 3 is a block diagram of another example printing cartridge 300 that can be used with the example printing system 100 of FIG. 1. In this example, the printing cartridge 300 is an integrated printing cartridge including the fluid container 140 and an example print head 305. The example printing cartridge 300 also includes an example flexible cable 310, example conductive pads 315, example nozzles 320, the example memory chip 145 and the example sensing die 155 of FIGS. 1 and/or 2 including a plurality of sensing locations 215. The example flexible cable 310 is coupled to the sides of the printing cartridge 300 and includes traces that couple the example memory chip 145, the example print head 305, the example conductive pads 315 and the example sensing die 155.

In operation, the example printing cartridge 300 may be installed in the carriage cradle 110 of, for example, the example printer 105 of FIG. 1. When the example printing cartridge 300 is installed within the carriage cradle 110, the example conductive pads 315 are pressed against corresponding electrical contacts in the carriage cradle 110 to enable the example printer 105 to communicate with and/or control the electrical functions of the printing cartridge 300. For example, the example conductive pads 315 enable the printer 105 to access and/or write to the example memory chip 145.

The memory chip 145 of the illustrated example may include a variety of information such as an identifier of the type of printing cartridge, an identification of the kind of fluid contained in the fluid container, calibration data, error information and/or other data. In some examples, the memory chip 145 includes information indicating when the printing cartridge 300 should receive maintenance. In some examples, the printer 105 can take appropriate action based on the information contained in the memory chip 145, such as altering printing routines to maintain image quality.

To print an image on the substrate 160 (e.g., paper), the example printer 105 moves the cradle carriage 110 containing the printing cartridge 300 over the substrate 160. To cause an image to be printed on the substrate 160, the example printer 105 sends electrical signals to the printing cartridge 300 via electrical contacts in the carriage cradle 110. The electrical signals pass through the conductive pads 315 of the printing cartridge 300 and are routed through the flexible cable 310 to the print head 305 to energize individual heating elements (e.g., resistors) within the die print head. The electrical signal passes through one of the heating elements to create a rapidly expanding vapor bubble of fluid that forces a small droplet of fluid out of a firing chamber within the print head 305 and through the corresponding nozzle 320 onto the surface of the substrate 160 to form an image on the surface of the substrate 160.

To make fluid level measurements, the printing cartridge 300 includes the example sensing die 155. The example sensing die 155 includes the plurality of sensing locations 215 to facilitate measuring fluid levels within the fluid container 140. The example sensing locations 215 facilitate measuring fluid levels by emitting a heat pulse at a selected sensing location 215 and generating a sensed voltage based on the temperature of the sensing die 155 at the sensing location 215. A comparator provided to the sensing die 155 outputs time-based information representative of a temperature decay rate for the sensing location 215. As discussed above, the rate at which the temperature decays at the sensing location 215 depends on the type of fluid that borders the sensing location 215. For example, a liquid such as ink will thermally conduct heat at a faster rate relative to air. The sensing die 155 then transmits the time-based information to the controller 125 via the flexible cable 310. In some implementations, the sensing die 155 may include a counter to generate a digital code based on the time-based information. In some such implementations, the sensing die 155 may transmit the digital code to the controller 125 via the flexible cable 310.

Figure 4:
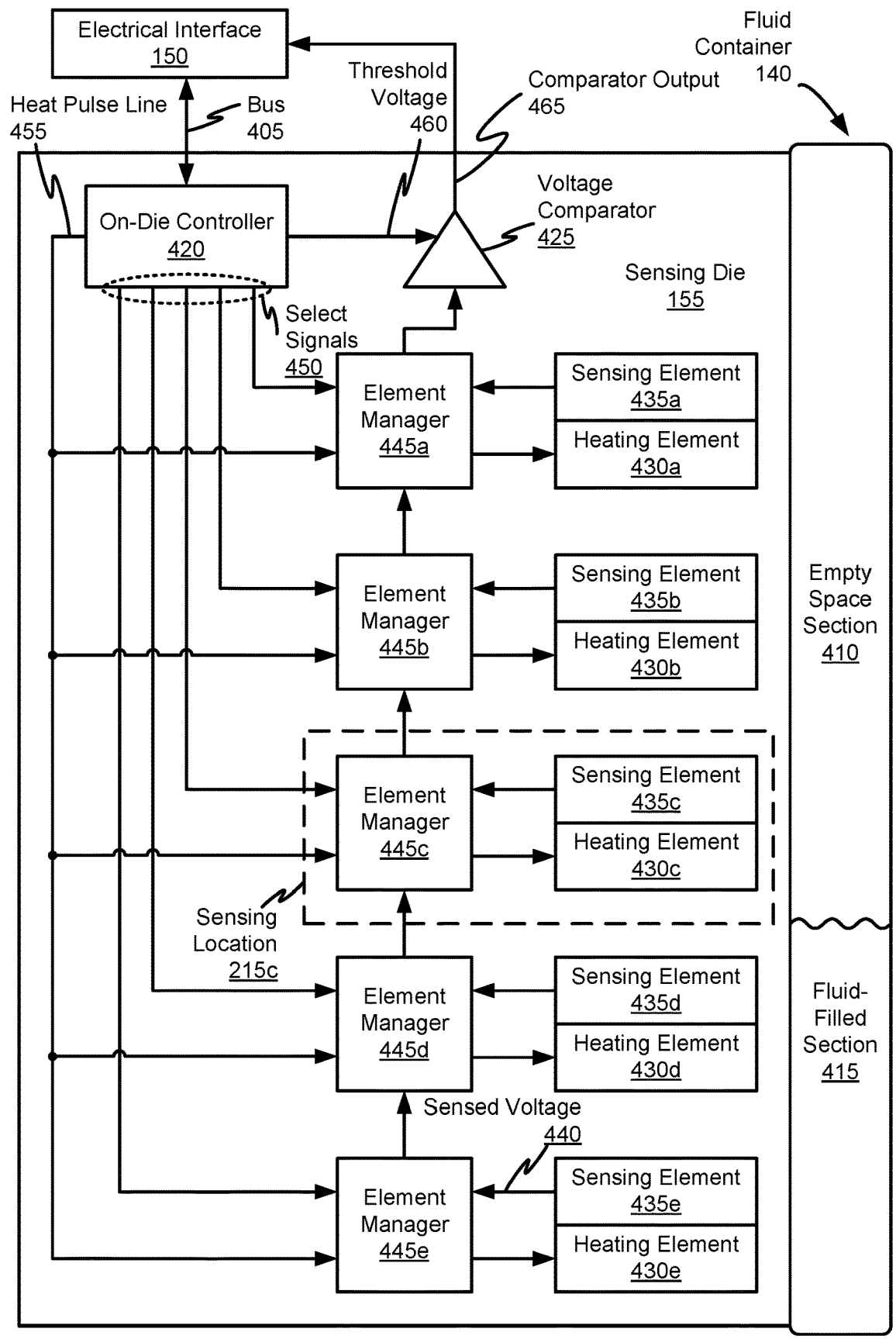
FIG. 4 illustrates a schematic view of a sensing die with a voltage comparator in communication with an electrical interface, according to an example implementation of the present subject matter.

FIG. 4 is a block diagram of an example implementation of the sensing die 155 of FIGS. 1, 2 and/or 3, according to an example implementation of the present subject matter. In an example implementation, the sensing die 155 is in contact with the fluid container 140 and in communication with the electrical interface 150 via a bus 405. In the illustrated example, the bus 405 is an Inter-Integrated Circuit (I2C) bus. However, other techniques for communicating information between the electrical interface 150 and the sensing die 155 may be used, alone or in combination with the aforedescribed communication interfaces. In the illustrated example, the fluid container 140 includes an example empty space section 410 and an example fluid-filled section 415.

In the illustrated implementation, the sensing die 155 facilitates measuring fluid levels of the fluid container 140 by initiating a heating event at a sensing location 215 and determining a rate at which heat dissipates at the sensing location 215 (e.g., by providing time-based information representative of a temperature decay rate). The temperature decay rate at the sensing location 215 depends on the type of fluid in thermal contact with the sensing location 215. For example, ink acts as a heat sink. Thus, the temperature decay rate at a location in thermal contact with air is relatively slower than the temperature decay rate at a location in thermal contact with ink.

The example sensing die 155 includes five example sensing locations 215a, 215b, 215c, 215d, 215e, an example on-die controller 420 and an example voltage comparator 425. The sensing locations, collectively referred to as sensing locations 215, enable measuring fluid level in the fluid container 140. For example, a first fluid (e.g., air) may be detected at the first, second and third sensing locations 215a, 215b, 215c, and a second fluid (e.g., ink) may be detected at the fourth and fifth sensing locations 215d, 215e. In such instances, the fluid container 140 may be determined to be forty percent filled with ink. The granularity of the fluid level measurement depends on the number of sensing locations 215 in the sensing die 155.

The sensing locations 215 include a heating element 430 to heat the sensing die 155 at the corresponding location and a sensing element 435 to generate a sensed voltage 440 corresponding to the temperature of the sensing die 155 at the corresponding location 215. The heating element 430 and the sensing element 435 are positioned so that heat emitted by the heating element 430 may be sensed by the corresponding sensing element 435. In some implementations, the heating element 430 emits a heat pulse having a duration of 200-250 microseconds with a power of at least 50 milliwatts. In the illustrated example, the heating element 430 is an electrical resistor. However, other devices for emitting a heat pulse may be used, alone or in combination with the aforedescribed devices. For example, the heating element 430 may be implemented by a poly-silicon resistor driven by a MOSFET circuit.

The example sensing elements 435 of FIG. 4 detect temperature (e.g., emitted by the heating element 430) and generate a sensed voltage 440 corresponding to the detected temperature. In the illustrated example, the sensing elements 435 are implemented using a diode (e.g., a P-N junction diode). However, other devices for generating a voltage based on a detected temperature may be used, alone or in combination with the aforedescribed devices.

In the illustrated implementation, each sensing location 215 is individually selectable under the control of a corresponding element manager 445. When a sensing location 215 is selected (e.g., the third sensing location 215c), the third element manager 445c enables a heat pulse to pass and the third heating element 430c emits the heat pulse to heat the surrounding area. The third element manager 445c also enables the sensed voltage generated by the third sensing element 435c to pass to the example voltage comparator 425.

In the illustrated implementation, the on-die controller 420 controls which sensing location 215 is tested. For example, the on-die controller 420 may select the third sensing location 215c to test and transmit a select signal 450 to activate the third element manager 445c corresponding to the selected sensing location 215c. The on-die controller 420 of FIG. 5 also generates a heat pulse to transmit to the selected sensing location 215c via a heat pulse line 455.

In the illustrated implementation, the electrical interface 150 instructs the on-die controller 420 which sensing location 215 to test. In some implementations, the electrical interface 150 instructs the on-die controller 420 to sequentially test the sensing locations 215. For example, the on-die controller 420 may sequentially actuate (e.g., activate) the element managers 445 in order from top to bottom (e.g., from the first sensing location 215a to the fifth sensing location 215e) or from bottom to top (e.g., from the fifth sensing location 215e to the first sensing location 215a).

In some implementations, the electrical interface 150 may instruct the on-die controller 420 to test a portion of the sensing locations 215. For example, the electrical interface 150 may use a priori search algorithm to identify which sensing locations 215 to test in an effort to reduce the total time and/or the total number of sensing locations 215 that are tested. In some examples, the electrical interface 150 may access a memory (e.g., the example memory chip 145) to obtain information regarding the last sensed fluid level within the fluid container 140 and then actuate (e.g., activate) the sensing locations 215 from nearer to further from the sensing location 215 associated with the last sensed fluid level. In some implementations, the electrical interface 150 may use the last sensed fluid level to predict a current fluid level (e.g., based on how many pages were printed since the last measurement) and then actuate the sensing locations 215 near the predicted current fluid level before the sensing locations 215 that are further from the predicted current fluid level. However, other techniques for selecting which sensing locations 215 and/or how many sensing locations 215 to test may be used, alone or in combination with the aforedescribed techniques.

In the illustrated implementation, the voltage comparator 425 is a device that compares the sensed voltage 440 generated by a sensing element 435 to a threshold voltage 460. The voltage comparator 425 generates a comparator output 465 representative of whether the sensed voltage satisfies the threshold voltage 460. For example, the voltage comparator 425 may generate a first value (e.g., a logical high value) when the sensed voltage is greater than or equal to the threshold voltage 460, and the voltage comparator 425 may generate a second value (e.g., a logical low value) when the sensed voltage is less than the threshold voltage 460. The example voltage comparator 425 provides the comparator output 465 to the electrical interface 150. In some implementations, the voltage comparator 425 provides the comparator output 465 to the electrical interface 150 via a sensing line. In some implementations, the voltage comparator 425 provides the comparator output 465 to the electrical interface 150 via the bus 405.

In the illustrated implementation, the comparator output 465 is time-based information representative of whether the sensed voltage 440 satisfies the threshold voltage 460. In the illustrated implementation, the electrical interface 150 translates (e.g., maps, interprets, etc.) the time-based information (e.g., the comparator output 465) provided by the voltage comparator 425 to a temperature decay rate. For example, the electrical interface 150 may include a timer to determine the duration of the flipping time based on when the instruction to test the sensing location 215 was provided to the on-die controller 420 and when the comparator output 465 flipped from the first state to the second state. In some implementations, the electrical interface 150 may start the timer at the end of the heat pulse (e.g., when a cooling period begins).

The electrical interface 150 monitors the temperature decay rate for at least a portion of the sensing locations 215 and determines a location of transition from a first fluid (e.g., air) to a second fluid (e.g., ink). For example, in the illustrated example of FIG. 4, the temperature decay rate associated with the first, second and third sensing locations 215a, 215b, 215c may be relatively larger compared to the temperature decay rate associated with the fourth and fifth sensing locations 215d, 215e. The sensing location 215 associated with the transition location corresponds to the fluid level in the fluid container 140. For example, the electrical interface 150 may determine that the fluid level in the fluid container 140 is between forty and sixty percent filled with ink. In some implementations, the electrical interface 150 may enhance the resolution of the fluid level measurement based on further processing of the temperature decay rate. For example, while the temperature decay rate at the third sensing location 215c may be within a range of rates associated with bordering air, the temperature decay rate may also indicate that ink is relatively near the third sensing location 215c (e.g., the fluid container 140 is fifty percent filled).

In the illustrated implementation of FIG. 4, the electrical interface 150 and/or the on-die controller 420 provides the threshold voltage 460 to the voltage comparator 425. In some implementations, the threshold voltage 460 is a fixed value. In some such implementations, the temperature decay rate for each sensing location 215 that is tested is based on a comparison of the corresponding sensed voltage 440 and the fixed threshold voltage 460.

In some implementations, the threshold voltage 460 is a variable that is provided for each heating event. For example, when initiating a heating event, the electrical interface 150 may identify the sensing location 215 to test and the threshold voltage 460 value to use. By varying the threshold voltage 460, the time-based information provided by the sensing die 155 (e.g., the comparator output 465) is not directly correlated to a fluid level. For example, a first flipping time may be associated with presence of air for a first threshold voltage and the first flipping time may be associated with presence of ink for a second threshold voltage.

In some implementations, the information communicated between the electrical interface 150 and the sensing die 155 may be encrypted. For example, the electrical interface 150 may encrypt information identifying which sensing location 215 to test and/or which threshold voltage 460 to use when comparing the sensed voltages 440 provided by the sensing elements 435. In some implementations, the sensing die 155 and/or the on-die controller 420 may include an encryption handler (e.g., a trusted platform module (TPM)) to decrypt encrypted information received from the electrical interface 150 and/or to encrypt information transmitted to the electrical interface 150.

In some implementations, the electrical interface 150 may obfuscate the time-based information by randomizing the order in which the sensing locations 215 are tested. In some implementations, the electrical interface 150 may repeat testing a sensing location 215. In some such implementations, the electrical interface 150 may use the same threshold voltage when repeating the testing or may use different threshold voltages for the different tests.

In the illustrated implementation, each sensing location 215 included in the sensing die 155 includes a heating element 430 that emits a heat pulse to raise the temperature of the sensing die 155 at a specific location (e.g., the selected sensing location 215). In some implementations, the sensing die 155 may include a relatively larger heating element that emits a heat pulse to heat the entire sensing die 155. In some such implementations, the sensing locations 215 may include the sensing element 435 and the element manager 445 to control when the sensed voltage generated by the sensing element 435 is provided to the voltage comparator 425. By using a single heating element instead of a plurality of heating elements, the construction of the sensing die 155 may be simplified. Furthermore, using a single heating element to heat the sensing die 155 enhances security by reducing the likelihood of being able to identify which sensing location 215 is being tested.

In operation, the electrical interface 150 initiates fluid level measurement by providing a sensing location 215 to test to the on-die controller 420 via the bus 405. The electrical interface 150 may initiate fluid level measurement in response to a command from a user (e.g., via a fluid level measurement control on the printer 105, via a fluid level measurement control in a graphical interface, etc.), in response to a page count (e.g., after every one page printed, after every ten pages printed, etc.), etc. The electrical interface 150 may encrypt the information regarding the selected sensing location 215c prior to communicating the information to the sensing die 155. In some implementations, the selected sensing location 215c may be selected in an ordered sequence, may be selected randomly, may be a repeat test, etc. The on-die controller 420 initiates a heating event for the selected sensing location 215c by generating and transmitting a heat pulse via the heat pulse line 455. The on-die controller 420 also selects the third element manager 445c associated with the selected sensing location 215c.

When selected, the third element manager 445c allows the heat pulse to pass through to the third heating element 430c, which emits the heat pulse. The third sensing element 435c converts the temperature of the sensing die 155 at the third sensing location 215c to a sensed voltage 440, which the third element manager 445c allows to pass to the voltage comparator 425.

The voltage comparator 425 compares the value of the sensed voltage 440 to the threshold voltage 460. In some implementations, the voltage comparator 425 is an analog-to-digital converter that compares the sensed voltage 440 to the threshold voltage 460 and outputs a first value (e.g., a logical high value) when the sensed voltage 440 satisfies the threshold voltage 460, and outputs a second value (e.g., a logical low value) when the sensed voltage 440 does not satisfy the threshold voltage 460. In some implementations, the threshold voltage 460 is a fixed value. In some implementations, the threshold voltage 460 varies and is provided by the electrical interface 150 for each heating event. In some implementations, the variable threshold voltage 460 value may be encrypted when transmitted to the sensing die 155. In some such implementations, the sensing die 155 and/or the on-die controller 420 may include an encryption chip (e.g., a TPM) to decrypt the information related to the sensing location 215 to be tested and/or the threshold voltage 460 to be used by the voltage comparator 425.

The output of the comparison performed by the voltage comparator 425 represents time-based information and may be used to determine a temperature decay rate at the selected sensing location 215c. For example, the voltage comparator 425 compares the sensed voltage 440 to the threshold voltage 460 and outputs a first value (e.g., a logical high value) when the sensed voltage 440 satisfies the threshold voltage 460 (e.g., is greater than or equal to the threshold voltage 460), and outputs a second value (e.g., a logical low value) when the sensed voltage does not satisfy the threshold voltage 460 (e.g., is less than the threshold voltage 460). In some implementations, the comparator output 465 is provided to the electrical interface 150 via the bus 405. In some implementations, the comparator output 465 is provided to the electrical interface 150 via a sense line.

The electrical interface 150 monitors the comparator output 465 and records a flip time representative of a time interval between when the heat pulse was emitted and when the comparator output 465 switched from the first value (e.g., a logical high value) to the second value (e.g., a logical low value). The duration of the flip times correspond to a temperature decay rate. By comparing the recorded flip times (and the temperature decay rates) for at least a portion of the sensing locations 215, the electrical interface 150 is able to identify a location of transitions from a first fluid (e.g., air) to a second fluid (e.g., ink). The sensing location 215 associated with the transition location corresponds to the fluid level in the fluid container 140.

In the illustrated implementation, the sensing die 155 responds to requests for fluid level measurements from the electrical interface 150. In some examples, the sensing die 155 may respond to requests for fluid level measurements from the controller 125. For example, if a printing cartridge does not include an electrical interface, the sensing die 155 may receive requests to sense fluid levels from the controller 125.

Figure 5:
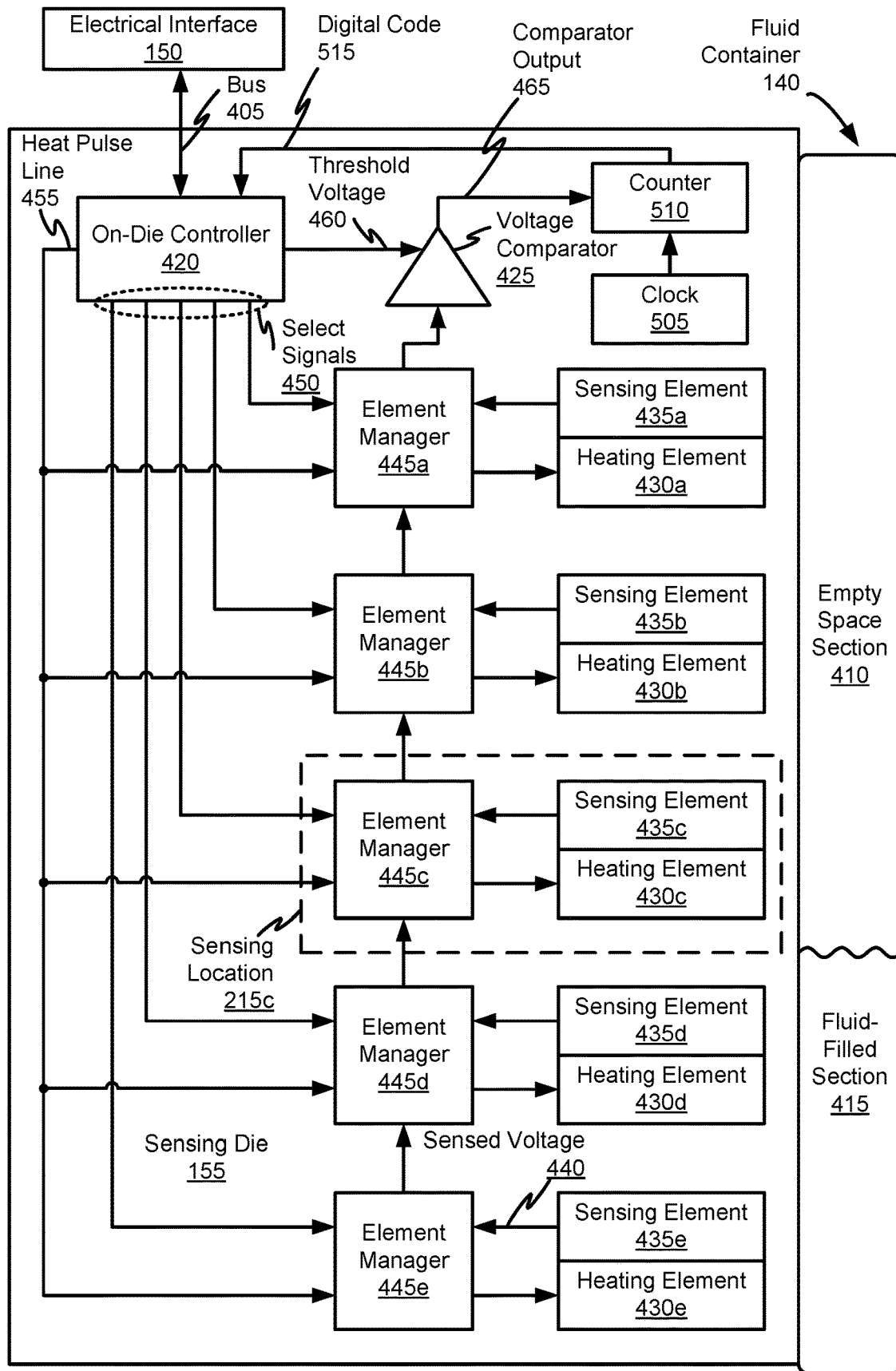
FIG. 5 illustrates a schematic view of another sensing die with a voltage comparator and counter in communication with an electrical interface, according to an example implementation of the present subject matter.

FIG. 5 is a block diagram of another example implementation of the sensing die 155 of FIGS. 1, 2 and/or 3, according to an example implementation of the present subject matter. In the illustrated implementation, the electrical interface 150 communicates with the sensing die 155 and/or the on-die controller 420 via the bus 405. The electrical interface 150 instructs the on-die controller 420 which sensing location 215 to test.

The example on-die controller 420 selects the example element manager 445 associated with the selected sensing location 215 (e.g., the third sensing location 215*c*). In response to being selected, the third element manager 445*c* allows a heat pulse, transmitted via the example heat pulse line 455, to pass to the third heating element 430*c*, which then emits the heat pulse to heat the sensing die 155 at and/or near the third sensing location 215*c*. The third example sensing element 435*c* detects the temperature and converts the temperature at the third sensing location 215*c* to a sensed voltage 440, which the third element manager 445*c* allows to pass to the example voltage comparator 425.

Similar to the example sensing die 155 disclosed in connection with FIG. 4, the voltage comparator 425 of FIG. 5 compares the sensed voltage 440 provided by the third sensing element 435*c* to the threshold voltage 460. In some implementations, the electrical interface 150 provides a variable threshold voltage 460 to the example voltage comparator 425. The example voltage comparator 425 outputs a first value when the sensed voltage 440 satisfies the threshold voltage 460 (e.g., the sensed voltage 440 is greater than or equal to the threshold voltage 460) and outputs a second value when the sensed voltage 440 does not satisfy the threshold voltage 460 (e.g., the sensed voltage 440 is less than the threshold voltage 460).

In some implementations, the sensing die 155 is provided an example clock 505 and an example counter 510. The example clock 505 provides a periodic clock signal to the counter 510. The counter 510 converts the time-based information 465 output by the voltage comparator 425 to a digital code 515 based on the clock signal provided clock 505. For example, the counter 510 may count the number of rising-edge clock signals received from the clock 505 while the comparator output 465 indicates that the sensed voltage 440 satisfies the threshold voltage 460 (e.g., the comparator output 465 is a logical high value). In the illustrated implementation, the digital code 515 represents the number of rising-edge clock signals counted by the counter 510 and is provided to the on-die controller 420 to transmit to the electrical interface 150. In some implementations, the on-die controller 420 and/or the sensing die 155 includes an encryption chip (e.g., a TPM chip) to encrypt the digital code 515 prior to transmitting to the electrical interface 150. In the illustrated implementation, the electrical interface 150 translates (e.g., maps, interprets, etc.) the digital code 515 (e.g., the comparator output 465) provided by the counter 510 to a temperature decay rate.

In some implementations, the clock 505 is implemented by a ring oscillator. However, other techniques for implementing a clock may be used, alone or in combination with the aforedescribed ring oscillator. In some implementations, the counter 510 is connected to a clock signal controlled by the electrical interface 150.

In some implementations, the counter 510 starts counting the number of clock cycles at the end of the heat pulse (e.g., when the cooling period begins). In other implementations, the counter 510 starts counting the number of clock cycles at the start of the heat pulse. In some implementations, the counter 510 stops counting when the comparator output 465 indicates that the sensed voltage 440 fails to satisfy the threshold voltage 460 (e.g., is less than the threshold voltage 460). For example, the counter 510 may start counting the number of clock cycles when the heat pulse ends and stop counting when the comparator output 465 flips from the first state (e.g., a logical high value) to the second state (e.g., a logical low value). In some such implementations, the counter 510 converts the time-based information output from the voltage comparator 425 to the digital code 515.

In some implementations, the counter 510 is reset and starts counting at the end of the heat pulse emitted by the heating element 430. In some implementations, the counter 510 is not reset between tests. For example, the counter 510 may count thirty clock cycles before the comparator output 465 flips to the second state during a first test and transit the digital code 515 representative of the thirty clock cycles to the on-die controller 420. When the second test starts, the counter 510 may continue counting from thirty clock cycles and output a digital code 515 representative of the new count. For example, if the counter 510 counted twenty clock cycles during the second test, the counter 510 may output a digital code 515 representative of fifty clock cycles. In some such implementations, the electrical interface 150 may maintain a record of the received digital codes 515 and adjust the clock cycle counts accordingly.

In some examples, the counter 510 is enabled and disabled based on the value of the comparator output 465. For example, when the sensed voltage 440 satisfies the threshold voltage 460, the comparator output 465 transitions from the second value (e.g., a logical low value) to the first value (e.g., a logical high value) and the counter 510 begins counting the number of clock cycles before the comparator output 465 transitions from the first value to the second value.

Figure 13:
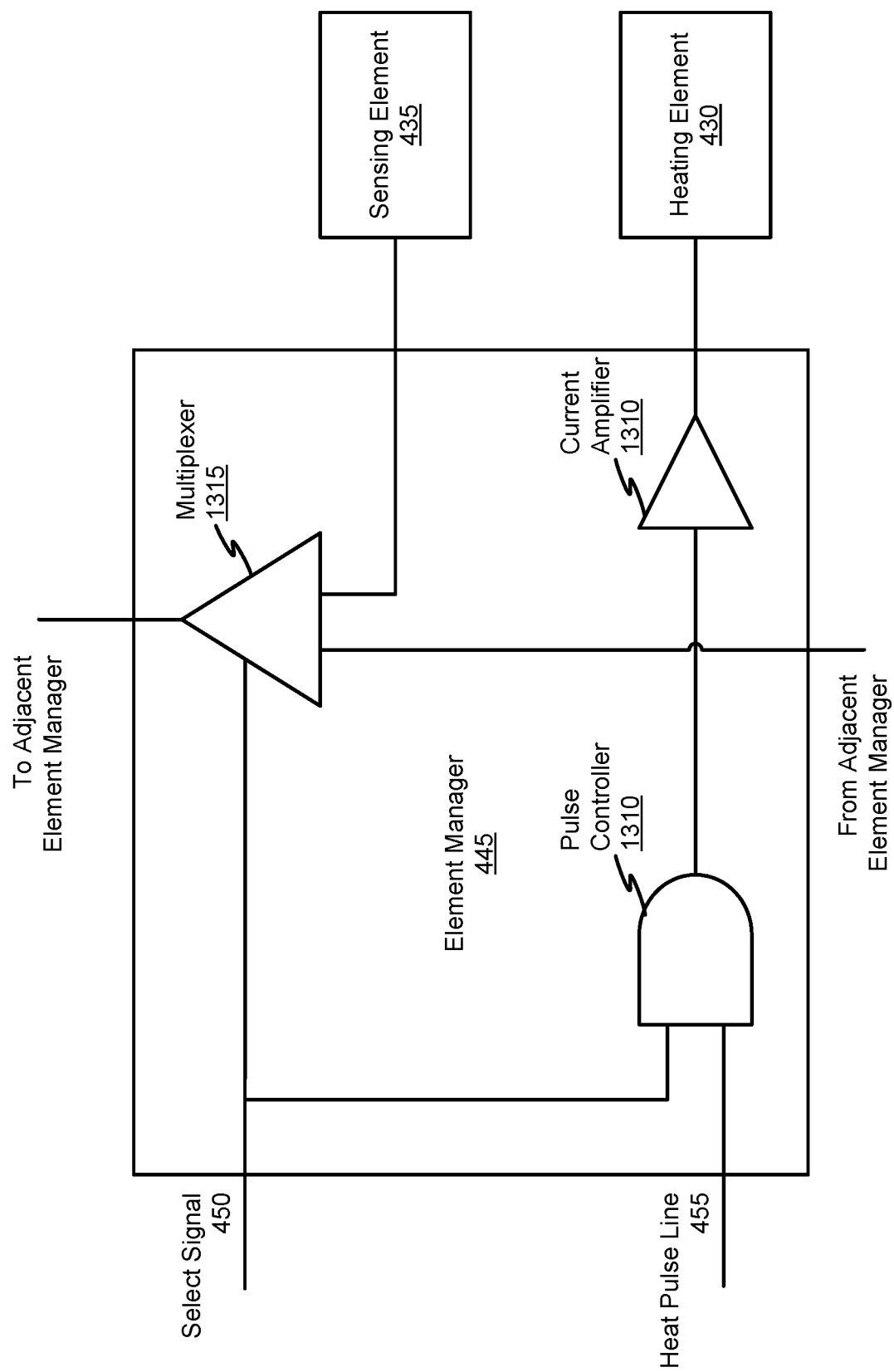
FIG. 13 illustrates a schematic view of an example element manager that can be used with the example sensing die of FIGS. 4 and/or 5, according to an example implementation of the present subject matter.

FIG. 13 is a block diagram of an example implementation of the element managers 445 of FIGS. 4 and/or 5, according to an example implementation of the present subject matter. In an example implementation, each sensing location 215 is provided the element manager 445 to control which heating element 430 and sensing element 435 is active at a time. For example, the element manager 445 controls which heating element 430 emits the heat pulse provided by the on-die controller 420. The element manager 445 also controls which sensed voltage 440 is provided to the voltage comparator 425.

In the illustrated implementation, the example element manager 445 includes an example pulse controller 1305, an example current amplifier 1310 and an example multiplexer 1315. The example pulse controller 1305 controls when the heat pulse transmitted by the on-die controller 420 is provided to the heating element 430. For example, when the select signal 450 is a logical high value and a heat pulse is transmitted via the heat pulse line 455, the pulse controller 1305 enables the heat pulse to pass and the heating element 430 to emit the heat pulse. Otherwise, if the select signal 450 is a logical low value and/or there is no heat pulse transmitted on the heat pulse line 455, no heat pulse is provided to the heating element 430 for emitting. In some implementations, the pulse controller 1305 may be implemented by a logical AND gate. However, other techniques for controlling the heat pulse may be used, alone or in combination with the aforedescribed pulse controller.

In the illustrated implementation, the example element manager 445 includes the current amplifier 1310 to increase (e.g., "drive") the current output by the pulse controller 1305. In some implementations, the current amplifier 1310 may be included with the pulse controller 1305. In other implementations, the current amplifier 1310 may be omitted from the element manager 445.

In the illustrated implementation, the example element manager 445 includes the multiplexer 1315 to control which value to output (e.g., to an adjacent element manager 445 and/or to the voltage comparator 425. In the illustrated implementation, the multiplexer 1315 is a 2-to-1 multiplexer that forwards the sensed voltage 440 when the select signal 450 is a logical high value and forwards an output from an adjacent element manager 445 when the select signal 450 is a logical low value. For example, referring to the third example sensing location 215*c* of FIG. 4, when the select signal 450 is a logical high value, the multiplexer 1315 enables the sensed voltage 440 generated by the sensing element 435*c* to pass to the element manager 445 of the second sensed location 215*b*. In contrast, when the select signal 450 is a logical low value, the multiplexer 1315 forwards the output of the element manager 445 of the fourth sensing location 215*c*, which may be a sensed voltage 440 generated by an adjacent sensing element (e.g., the fourth sensing element 435*d* or the fifth sensing element 435*e*). However, other techniques for selecting which signal to forward may be used, alone or in combination with the aforedescribed multiplexer.

Figure 6:
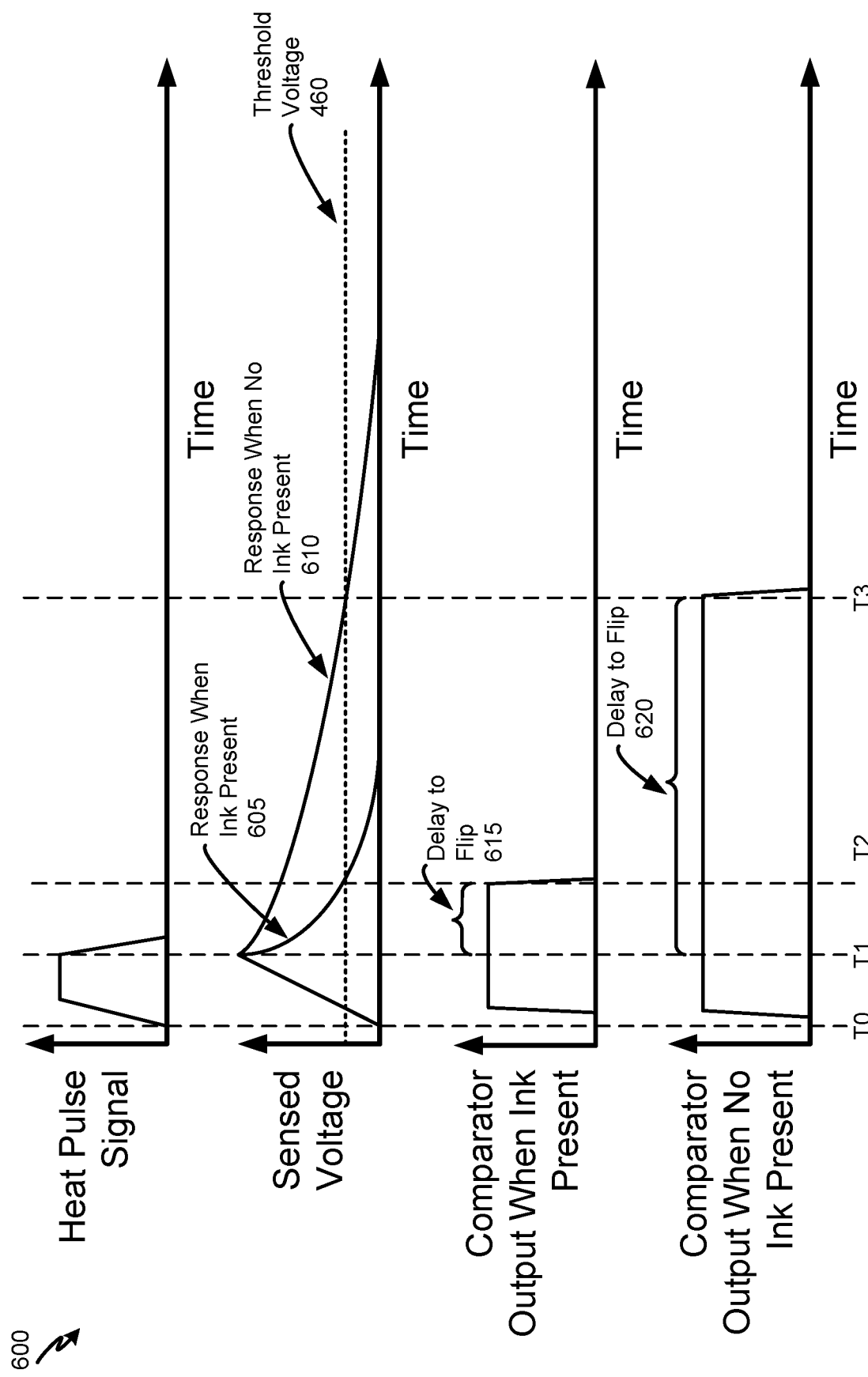
FIGS. 6-8 illustrate example sensing sequences, according to example implementations of the present subject matter.

FIG. 6 illustrates a sensing sequence 600 with respect to a heat pulse signal, sensed voltage, and comparator outputs when a fluid (e.g., ink) is present and when the fluid is not present. In the illustrated sensing sequence 600, the threshold voltage 460 is a fixed value. At time T0, a heat pulse signal is transmitted to a sensing location 215 on the sensing die 155. For example, the on-die controller 420 may select the third element manager 445*c* associated with the third sensing location 215*c* and transmit the heat pulse via the heat pulse line 455. The third element manager 445*c* allows the heat pulse to pass to the corresponding heating element 430*c*, which then emits the heat pulse to heat the sensing die 155 at the sensing location 215*c*. In some implementations, the heat pulse has a power of 50 milliwatts and a duration 200-250 microseconds.

Between time T0, when the heating event is initiated, and time T1, when the heating event ends (e.g., a cooling period begins), the temperature at the third sensing location 215*c* increases. Accordingly, the sensed voltage 440 generated by the third sensing element 435*c* corresponding to the third sensing location 215*c* also increases. Furthermore, when the sensed voltage 440 is greater than the threshold voltage 460, the comparator outputs the first value (e.g., a logical high value).

At time T1, the heating event ends and a cooling period at the sensing location 215*c* begins. In the illustrated example, the temperature at the third sensing location 215*c* begins to decay at time T1. The rate of the temperature decay rate depends on the type of fluid the third sensing element 435*c* is proximal. For example, an example temperature decay rate 605 measured at the third sensing location 215*c* when the sensing location 215*c* is proximate to ink is relatively fast when compared to an example temperate decay rate 610 measured at the third sensing location 215*c* when the sensing location 215*c* is not proximate to ink (e.g., is proximal to air).

At time T2, the sensed voltage 440 at the third sensing location 215*c* fails to satisfy the threshold voltage 460 when ink is proximal to the third sensing location 215*c*. In the illustrated example, the duration between when the cooling period begins at time T1 and the comparator output 465 flips from the logical high value to the logical low value at time T2 is referred to as an ink-based flipping time 615.

At time T3, the sensed voltage 440 at the third sensing location 215*c* fails to satisfy the threshold voltage 460 when ink is not proximate to the third sensing location 215*c*. In the illustrated example, the duration between when the cooling period begins at time T1 and the comparator output 465 flips from the logical high value to the logical low value at time T3 is referred to as an air-based flipping time 620.

By comparing the flipping times 615, 620, the electrical interface 150 is able to determine the location where the presence of ink is proximate and then not proximate. For example, with reference to FIG. 4, the ink-based flipping time 615 may represent the time-based information provided to the electrical interface 150 regarding the fourth and fifth sensing locations 215*d*, 215*e*. The air-based flipping time 620 may represent the time-based information provided to the electrical interface 150 regarding the first, second and third sensing locations 215*a*, 215*b*, 215*c*.

Although not shown in the illustrated sequence 600, a propagation delay may occur between when the heat pulse is emitted at time T0, when the cooling period begins at time T1, and/or when the comparator output 465 transitions from the logical high value to the logical low value at time T2 and time T3.

Figure 7:
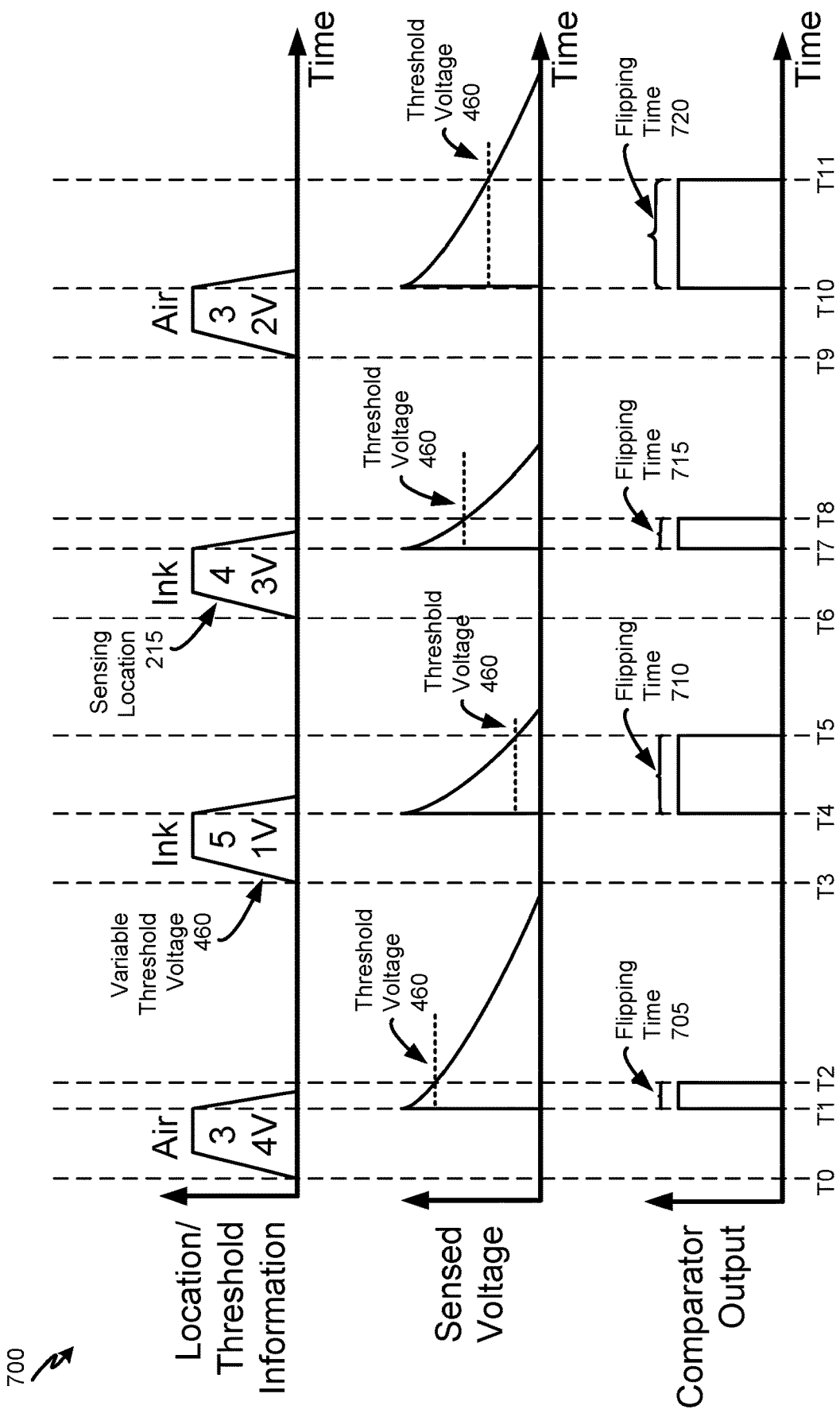

FIG. 7 illustrates a sensing sequence 700 with respect to location/threshold information, sensed voltage, and comparator outputs based on the threshold voltages and whether ink is proximate to the sensing location of interest. The sensing sequence 700 includes a series of heating events initiated at least at four sensing locations 215. Each of the four heating events included in the sensing sequence 700 is associated with a variable threshold voltage 460. The location/threshold information identifies the sensing location 215 to test and the threshold voltage 460 that the voltage comparator 425 is to use. In the illustrated sequence, the sensing location 215 is randomized and the threshold voltage 460 varies based on the particular heating event. The sensed voltage illustrates the temperature decay rate for the selected sensing location 215 compared to the applied threshold voltage 460. The comparator output illustrates the output of the voltage comparator 425 based on a comparison of the sensed voltage 440 and the threshold voltage 460 and the flipping time when the comparator output 465 flips from a logical high value to a logical low value.

The electrical interface 150 provides location/threshold information associated with a first test, which indicates that the third sensing location 215*c* is to be tested and a four volt threshold voltage is to be applied by the voltage comparator 425. At time T0, a heating event is initiated (e.g., at heat pulse is emitted) at the third sensing location 215*c* and the temperature (and the sensed voltage) at the third sensing location 215*c* increases due to the heat pulse. At time T1, the heat pulse ends and the sensed voltage 440 detected by the example third sensing element 435*c* begins to decay as the cooling period begins. The voltage comparator 425 compares the sensed voltage 440 to the threshold voltage 460 (e.g., four volts) and outputs a logical high value when the sensed voltage 440 is greater than or equal to the threshold voltage and outputs a logical low value when the sensed voltage 440 is less than the threshold voltage. At time T2, the comparator output 465 flips from the first state (e.g., the logical high state) to the second state (e.g., the logical low state). The comparator output 465 is provided to the electrical interface 150, which converts the time-based information into a duration (e.g., a value representative of a first flipping time 705).

The electrical interface 150 provides location/threshold information associated with a second test, which indicates that the fifth sensing location 215*e* is to be tested and a one volt threshold voltage is to be applied by the voltage comparator 425. At time T3, a heating event is initiated (e.g., at heat pulse is emitted) at the fifth sensing location 215*e* and the temperature (and the sensed voltage) at the fifth sensing location 215*e* increases due to the heat pulse. At time T4, the heat pulse ends and the sensed voltage 440 detected by the example fifth sensing element 435*e* begins to decay as the cooling period begins. The voltage comparator 425 compares the sensed voltage 440 to the threshold voltage 460 (e.g., one volt) and outputs a logical high value when the sensed voltage 440 is greater than or equal to the threshold voltage and outputs a logical low value when the sensed voltage 440 is less than the threshold voltage. At time T5, the comparator output 465 flips from the first state (e.g., the logical high state) to the second state (e.g., the logical low state). The comparator output 465 is provided to the electrical interface 150, which converts the time-based information into a duration (e.g., a value representative of a second flipping time 710).

The electrical interface 150 provides location/threshold information associated with a third test, which indicates that the fourth sensing location 215*e* is to be tested and a three volt threshold voltage is to be applied by the voltage comparator 425. At time T6, a heating event is initiated (e.g., at heat pulse is emitted) at the fourth sensing location 215*d* and the temperature (and the sensed voltage) at the fourth sensing location 215*d* increases due to the heat pulse. At time T7, the heat pulse ends and the sensed voltage 440 detected by the example fourth sensing element 435*d* begins to decay as the cooling period begins. The voltage comparator 425 compares the sensed voltage 440 to the threshold voltage 460 (e.g., three volt) and outputs a logical high value when the sensed voltage 440 is greater than or equal to the threshold voltage and outputs a logical low value when the sensed voltage 440 is less than the threshold voltage. At time T8, the comparator output 465 flips from the first state (e.g., the logical high state) to the second state (e.g., the logical low state). The comparator output 465 is provided to the electrical interface 150, which converts the time-based information into a duration (e.g., a value representative of a third flipping time 715).

The electrical interface 150 provides location/threshold information associated with a fourth test, which indicates that the third sensing location 215*c* is to be tested, again, and a two volt threshold voltage is to be applied by the voltage comparator 425. At time T9, a heating event is initiated (e.g., at heat pulse is emitted) at the third sensing location 215*c* and the temperature (and the sensed voltage) at the third sensing location 215*c* increases due to the heat pulse. At time T10, the heat pulse ends and the sensed voltage 440 detected by the example third sensing element 435*c* begins to decay as the cooling period begins. The voltage comparator 425 compares the sensed voltage 440 to the threshold voltage 460 (e.g., two volts) and outputs a logical high value when the sensed voltage 440 is greater than or equal to the threshold voltage and outputs a logical low value when the sensed voltage 440 is less than the threshold voltage. At time T11, the comparator output 465 flips from the first state (e.g., the logical high state) to the second state (e.g., the logical low state). The comparator output 465 is provided to the electrical interface 150, which converts the time-based information into a duration (e.g., a value representative of a fourth flipping time 705).

In the illustrated sensing sequence 700, the first test (e.g., initiated at time T0) and the fourth test (e.g., initiated at time T9) are directed to the same sensing location 215*c*. In addition, the order in which the sensing locations are tested is randomized. Randomizing the order of the sensing locations 215 that are tested and repeating at least one of the sensing locations 215 while measuring fluid levels may be useful for obfuscating the time-based information provided by the sensing die 155 to the electrical interface 150.

In the illustrated sensing sequence 700, although the first test and the fourth test are directed to the same sensing location 215*c*, the threshold voltage 460 applied during each test is different. For example, during the first test, the threshold voltage 460 applied by the voltage comparator 425 is four volts and during the fourth test, the threshold voltage applied by the voltage comparator 425 is two volts. As a result, in the illustrated sensing sequence 700, even though the third sensing locations 215*c* is proximate to air during both tests, the duration of the first flipping time 705 and the fourth flipping time 720 is different. For example, the temperature decay rate is similar during the first test and the fourth test and, thus, the time it takes for the voltage to stop satisfying the first threshold voltage 460 (e.g., the sensed voltage is greater than or equal to four volts) is relatively less time than the time it takes for the sensed voltage to stop satisfying the fourth threshold voltage 460 (e.g., the sensed voltage is greater than or equal to two volts). Accordingly, the fourth flipping time 720 is longer than the first flipping time 705. Without knowing which sensing location 215 is being tested and what the threshold voltage 460 is applied to the test, the flipping times cannot be reliably mapped to a fluid level measurement, thereby increasing security when transmitting fluid level information.

Figure 8:
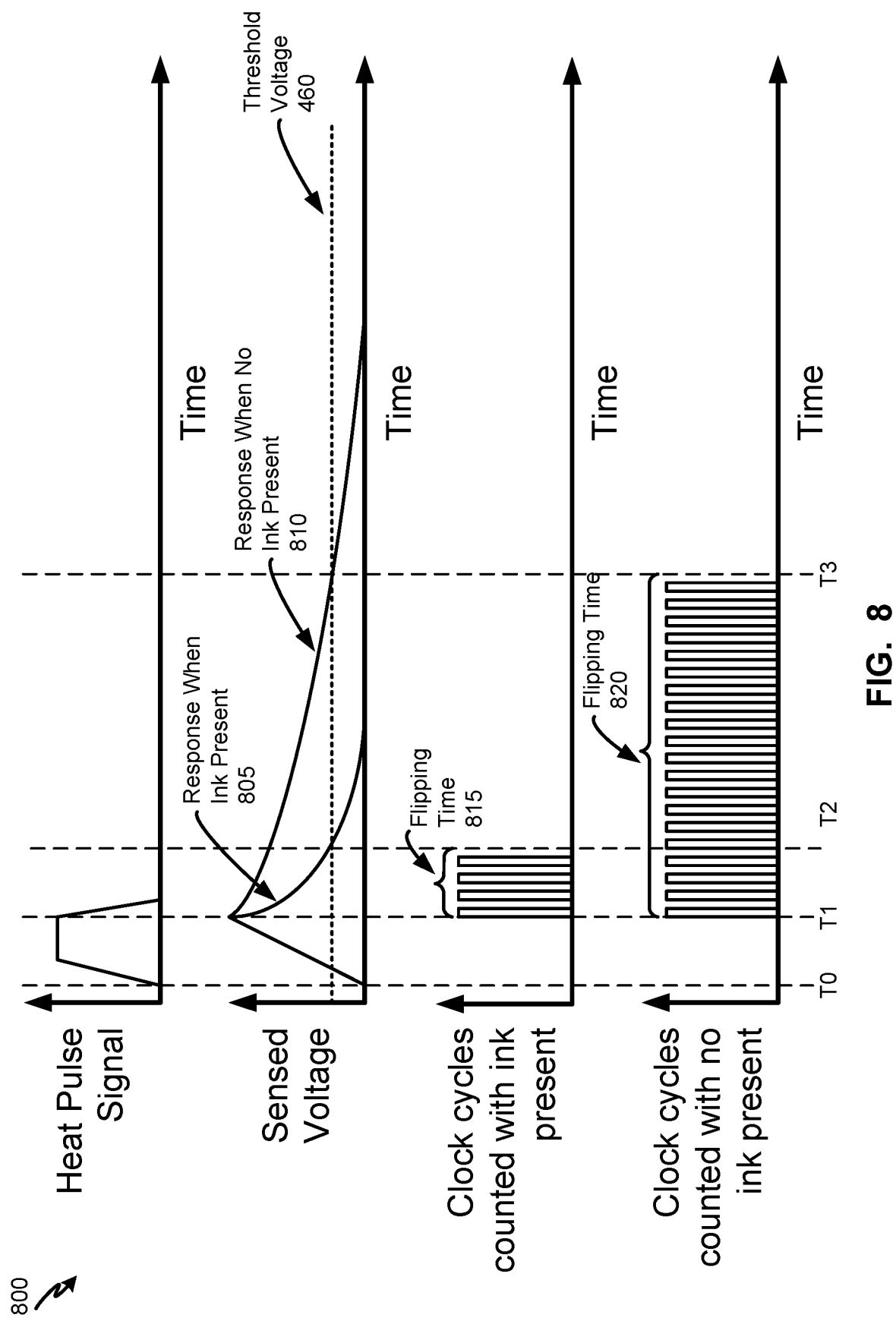

FIG. 8 illustrates a sensing sequence 800 with respect to a heat pulse signal, sensed voltage, and clock cycles counted when a fluid (e.g., ink) is present and when the fluid is not present. In the illustrated sensing sequence 800, the threshold voltage 460 is a fixed value. At time T0, a heat pulse signal is transmitted to a sensing location 215 on the sensing die 155. For example, the on-die controller 420 may select the third element manager 445*c* associated with the third sensing location 215*c* and transmit the heat pulse via the heat pulse line 455. The third element manager 445*c* allows the heat pulse to pass to the corresponding heating element 430*c*, which then emits the heat pulse to heat the sensing die 155 at the sensing location 215*c*. In some implementations, the heat pulse has a power of 50 milliwatts and a duration 200-250 microseconds.

Between time T0, when the heating event is initiated, and time T1, when the heating event ends (e.g., a cooling period begins), the temperature at the third sensing location 215*c* increases. Accordingly, the sensed voltage 440 generated by the third sensing element 435*c* corresponding to the third sensing location 215*c* also increases. Furthermore, when the sensed voltage 440 is greater than the threshold voltage 460, the comparator outputs the first value (e.g., a logical high value). In the illustrated sequence 800, when the voltage comparator 425 outputs the logical high value, the example counter 510 begins counting a number of clock cycles before the comparator output 465 transitions from the logical high value to the logical low value.

At time T1, the heating event ends and the cooling period at the third sensing location 215c begins. In the illustrated sequence 800, the temperature at the third sensing location 215c begins to decay at time T1. The rate of the temperature decay rate depends on the type of fluid the third sensing element 435c is proximal. For example, an example temperature decay rate 805 measured at the third sensing location 215c when the sensing location 215c is proximate to ink is relatively fast when compared to an example temperate decay rate 810 measured at the third sensing location 215c when the sensing location 215c is not proximate to ink (e.g., is proximal to air).

At time T2, the sensed voltage 440 at the third sensing location 215c fails to satisfy the threshold voltage 460 when ink is proximal to the third sensing location 215c. In the illustrated sequence 800, when the comparator output 465 flips from the logical high state to the logical low state at time T2, the counter 510 stops counting. In the illustrated sequence, the counter 510 counts four clock cycles during a first flipping time 815.

At time T3, the sensed voltage 440 at the third sensing location 215c fails to satisfy the threshold voltage 460 when ink is not proximate to the third sensing location 215c. In the illustrated sequence 800, when the comparator output 465 flips from the logical high state to the logical low state at time T3, the counter 510 stops counting. In the illustrated sequence, the counter 510 counts twenty clock cycles during a second flipping time 820.

The number of clock cycles counted by the counter 510 during a flipping time depends on the period during which the comparator output 465 stays in the logical high state and based on characteristics of the clock 505. For example, the number of clock cycles that are counted during the second flipping time 820 may be higher when the clock 505 has a relatively higher frequency than when the clock 505 has a lower frequency.

Although not shown in the illustrated sequence 800, a propagation delay may occur between when the heat pulse is emitted at time T0, when the cooling period begins at time T1, and/or when the counter 510 stops counting clock cycles due to the comparator output 465 transitions from the logical high value to the logical low value at time T2 and time T3.

While an example manner of implementing the printing system 100 is illustrated in FIGS. 1-5 and/or 13, in some examples, at least one of the elements, processes and/or devices illustrated in FIGS. 1-5 and/or 13 may be combined, divided, re-arranged, omitted, eliminated and/or implemented in any other way. Further, the example controller 125, the example memory 130, the example memory chip 145, the example electrical interface 150, the example on-die controller 420, the example voltage comparator 425, the example element managers 445, the example clock 505, the example counter 510, the example pulse controller 1305, the example current amplifier 1310, the example multiplexer 1315 and/or, more generally, the example printing system 100 of FIGS. 1-5 and/or 13 may be implemented by hardware, software, firmware and/or any combination of hardware, software and/or firmware. Thus, for example, any of the example controller 125, the example memory 130, the example memory chip 145, the example electrical interface 150, the example on-die controller 420, the example voltage comparator 425, the example element managers 445, the example clock 505, the example counter 510, the example pulse controller 1305, the example current amplifier 1310, the example multiplexer 1315 and/or, more generally, the example printing system 100 of FIGS. 1-5 and/or 13 can be implemented by a circuit(s), a programmable processor(s), an application specific integrated circuit(s) (ASIC(s)), a programmable logic device(s) (PLD(s)), a field programmable gate array(s) (FPGA(s)) and/or a field programmable logic device(s) (FPLD(s)), etc.

When reading any of the apparatus or system claims of this patent to cover a purely software and/or firmware implementation, at least one of the example controller 125, the example memory 130, the example memory chip 145, the example electrical interface 150, the example on-die controller 420, the example element managers 445, the example clock 505, the example counter 510, the example pulse controller 1305, the example current amplifier 1310 and/or the example multiplexer 1315 is hereby expressly defined to include a tangible computer readable storage device or storage disc such as a memory, DVD, CD, Blu-ray, etc. storing the software and/or firmware. Further still, the example printing system 100 of FIGS. 1-5 and/or 13 may include an element(s), process(es) and/or devices in addition to, or instead of, those illustrated and/or may include more than one of any or all of the illustrated elements, processes and devices.

Figure 9:
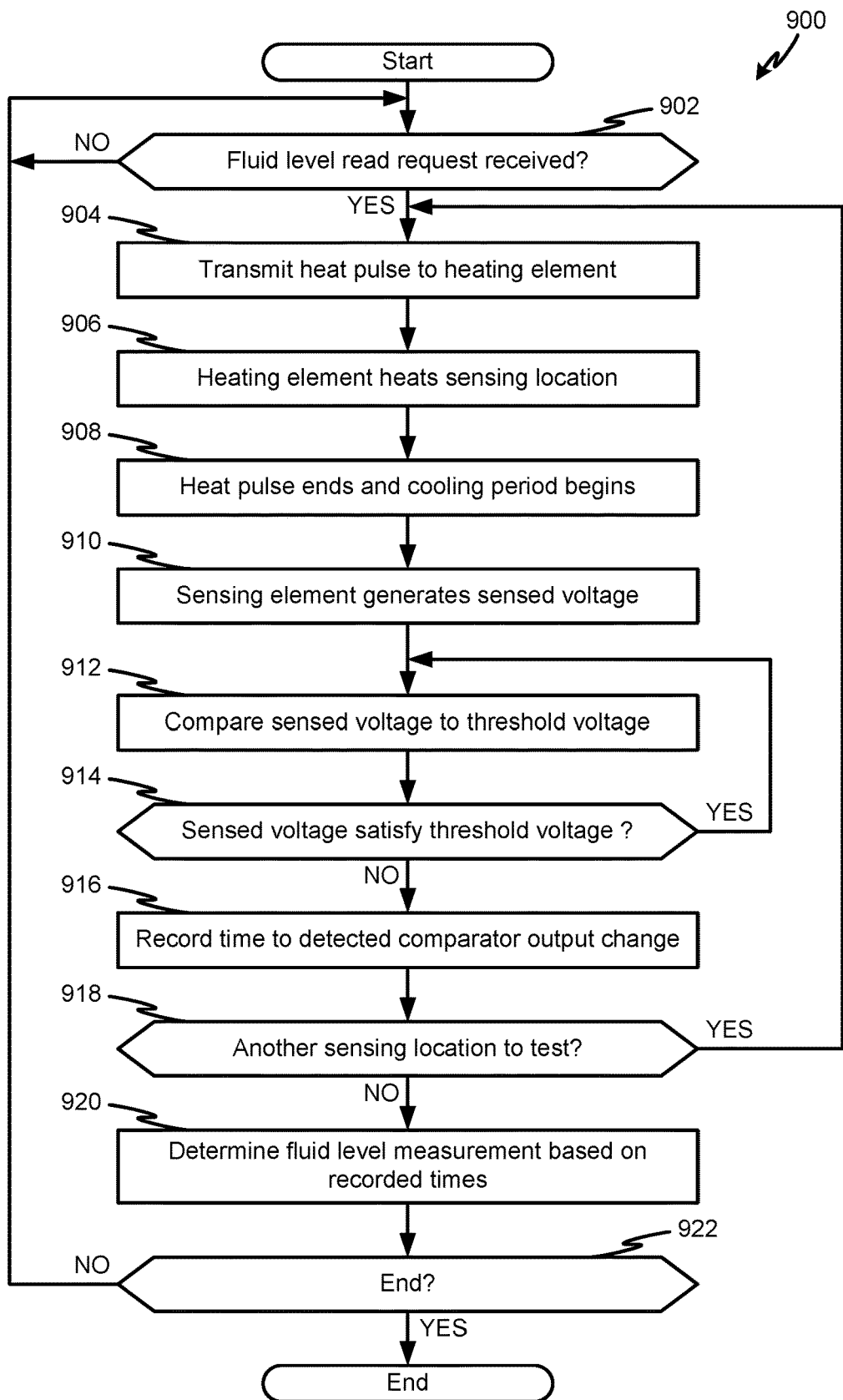
FIGS. 9-11 are example flowcharts representative of example processes that may be executed to implement the example printing cartridges of FIGS. 1-5 and/or 13.
Figure 10:
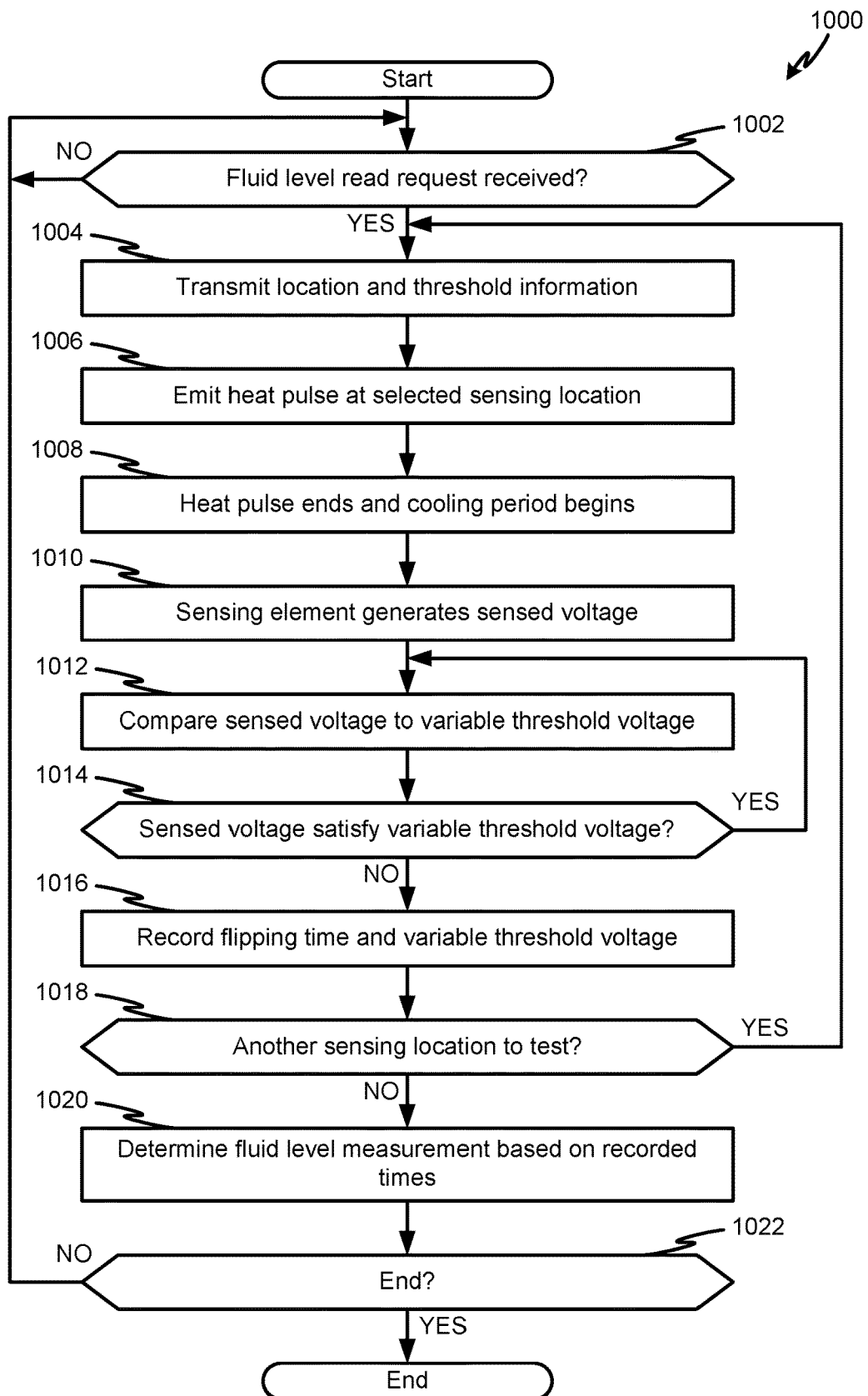

Flowcharts representative of example machine readable instructions for implementing the printing system 100 of FIGS. 1-5 and/or 13 are shown in FIGS. 9, 10 and/or 11. In these examples, the machine readable instructions comprise a program for execution by a processor such as the processor 1212 shown in the example processor platform 1200 discussed below in connection with FIG. 12. The programs may be implemented in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof can alternatively be executed by a device other than the processor 1212 and/or implemented in firmware or dedicated hardware. Further, although the example programs are described with reference to the flowcharts illustrated in FIGS. 9, 10 and/or 11, many other methods of implementing the example printing system 100 may also be used. For example, the order of execution of the blocks may be changed, and/or some of the blocks described may be changed, eliminated, or combined.

As mentioned above, the example processes of FIGS. 9, 10 and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. The example processes of FIGS. 9, 10 and/or 11 may also be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process 900 of FIG. 9 begins at block 902 by determining whether a fluid level read request was received. For example, the electrical interface 150 may receive a fluid level read request in response to a command from a user, in response to a page count, etc. At block 904, the process 900 of FIG. 9 transmits a heat pulse to a selected sensing location 215 on the sensing die 155. For example, the electrical interface 150 may provide a sensing location (e.g., the third sensing location 215c) to the on-die controller 420, which then selects the third sensing location 215c by enabling the third element manager 445c. At block 906, the third element manager 445c allows the heat pulse to pass to the third heating element 430c and the third heating element 430 emits the heat pulse to heat the third sensing location 215c. In some implementations, the heat pulse has a duration of 200-250 microseconds and a power of 50 milliwatts. At block 908, the heat pulse ends and a cooling period begins.

At block 910, the third sensing element 435c associated with the third sensing location detects the temperature of the sensing die 155 proximate to the third sensing location 215c and generates a sensed voltage 440 based on the detected temperature. At block 912, the example voltage comparator 425 compares the sensed voltage 440 to the threshold voltage 460. In some implementations, the electrical interface 150 provides a fixed value to the voltage comparator 425. If, at block 914, the voltage comparator 425 determines that that sensed voltage 440 satisfies the threshold voltage 460 (e.g., the sensed voltage 440 is greater than or equal to the threshold voltage 460), then control returns to block 912 to compare the sensed voltage 440 to the threshold voltage 460.

If, at block 914, the voltage comparator 425 determines that the sensed voltage 440 does not satisfy the threshold voltage 460 (e.g., the sensed voltage 440 is less than the threshold voltage 460), then, at block 916, the process 900 records a flipping time associated with the output of the comparator 425. For example, the electrical interface 150 may record the flipping time associated with when the comparator output 465 flipped from the first state (e.g., a logical high value) to the second state (e.g., a logical low value). At block 918, the process 900 determines whether there is another sensing location 215 to test. For example, the electrical interface 150 may test a portion of the sensing locations 215 and/or all of the sensing locations 215 included in the sensing die 155. If, at block 918, the process 900 determines that there is another sensing location 215 to test, then control returns to block 904 to transmit a heat pulse to the selected sensing location 215.

If, at block 918, the process 900 determines that there is not another sensing location 215 to test, then, at block 920, the process 900 determines a fluid level measurement based on the recorded flipping times. For example, the electrical interface 150 may process the recorded flipping times and identify a location where the presence of a fluid (e.g., ink) transitions from proximate to not proximate based on a change in the recorded flipping times. At block 922, the process 900 FIG. 9 determines whether to continue making fluid level measurements. If, at block 922, the process 900 of FIG. 9 determines to continue making fluid level measurements, control returns to block 902 to determine whether a fluid level read request was received. Otherwise, the example process 900 of FIG. 9 ends.

The process 1000 of FIG. 10 begins at block 1002 by determining whether a fluid level read request was received. For example, the electrical interface 150 may receive a fluid level read request in response to a command from a user, in response to a page count, etc. At block 1004, the process 1000 of FIG. 10 transmits location information identifying a location to test and threshold information identifying a threshold voltage to apply. For example, the electrical interface 150 may instruct the on-die controller 420 to test the third sensing location 215c and that the voltage comparator 425 is to use a four volt threshold voltage 460 when comparing the sensed voltage 400. In some implementations, the location information and/or the threshold information is encrypted by the electrical interface 150 prior to transmitting to the on-die controller 420 and/or the sensing die 155.

At block 1006, the process 1000 of FIG. 10 emits a heat pulse at the selected sensing location and heats the sensing die 155 at the third sensing location 215c. In some implementations, the heat pulse has a duration of 200-250 microseconds and a power of 50 milliwatts. At block 1008, the heat pulse ends and a cooling period begins.

At block 1010, the third sensing element 435c associated with the third sensing location 215c detects the temperature of the sensing die 155 proximate to the third sensing location 215c and generates a sensed voltage 440 based on the detected temperature. At block 1012, the example voltage comparator 425 compares the sensed voltage 440 to the threshold voltage 460. If, at block 1014, the voltage comparator 425 determines that that sensed voltage 440 satisfies the threshold voltage 460 (e.g., the sensed voltage 440 is greater than or equal to four volts), then control returns to block 1012 to compare the sensed voltage 440 to the threshold voltage 460.

If, at block 1014, the voltage comparator 425 determines that the sensed voltage 440 does not satisfy the threshold voltage 460 (e.g., the sensed voltage 440 is less than four volts), then, at block 1016, the process 1000 records a flipping time associated with the output of the comparator 425 and the threshold voltage 460 used by the voltage comparator 425. For example, the electrical interface 150 may record the flipping time associated with when the comparator output 465 flipped from the first state (e.g., a logical high value) to the second state (e.g., a logical low value). At block 1018, the process 1000 determines whether there is another sensing location 215 to test. For example, the electrical interface 150 may test a portion of the sensing locations 215 and/or all of the sensing locations 215 included in the sensing die 155. If, at block 1018, the process 1000 determines that there is another sensing location 215 to test, then control returns to block 1004 to transmit a heat pulse to the selected sensing location 215. In some implementations, the process 1000 obfuscates the sensing locations 215 being tested by randomizing the order that the sensing locations 215 are tested, repeating testing of at least one sensing location 215, etc.

If, at block 1018, the process 1000 determines that there is not another sensing location 215 to test, then, at block 1020, the process 1000 determines a fluid level measurement based on the recorded flipping times and the applied threshold voltages. For example, the electrical interface 150 may process the recorded flipping times and identify a location where the presence of a fluid (e.g., ink) transitions from proximate to not proximate based on a change in the recorded flipping times. At block 1022, the process 1000 of FIG. 10 determines whether to continue making fluid level measurements. If, at block 1022, the process 1000 of FIG. 10 determines to continue making fluid level measurements, control returns to block 1002 to determine whether a fluid level read request was received. Otherwise, the example process 1000 of FIG. 10 ends.

Figure 11:
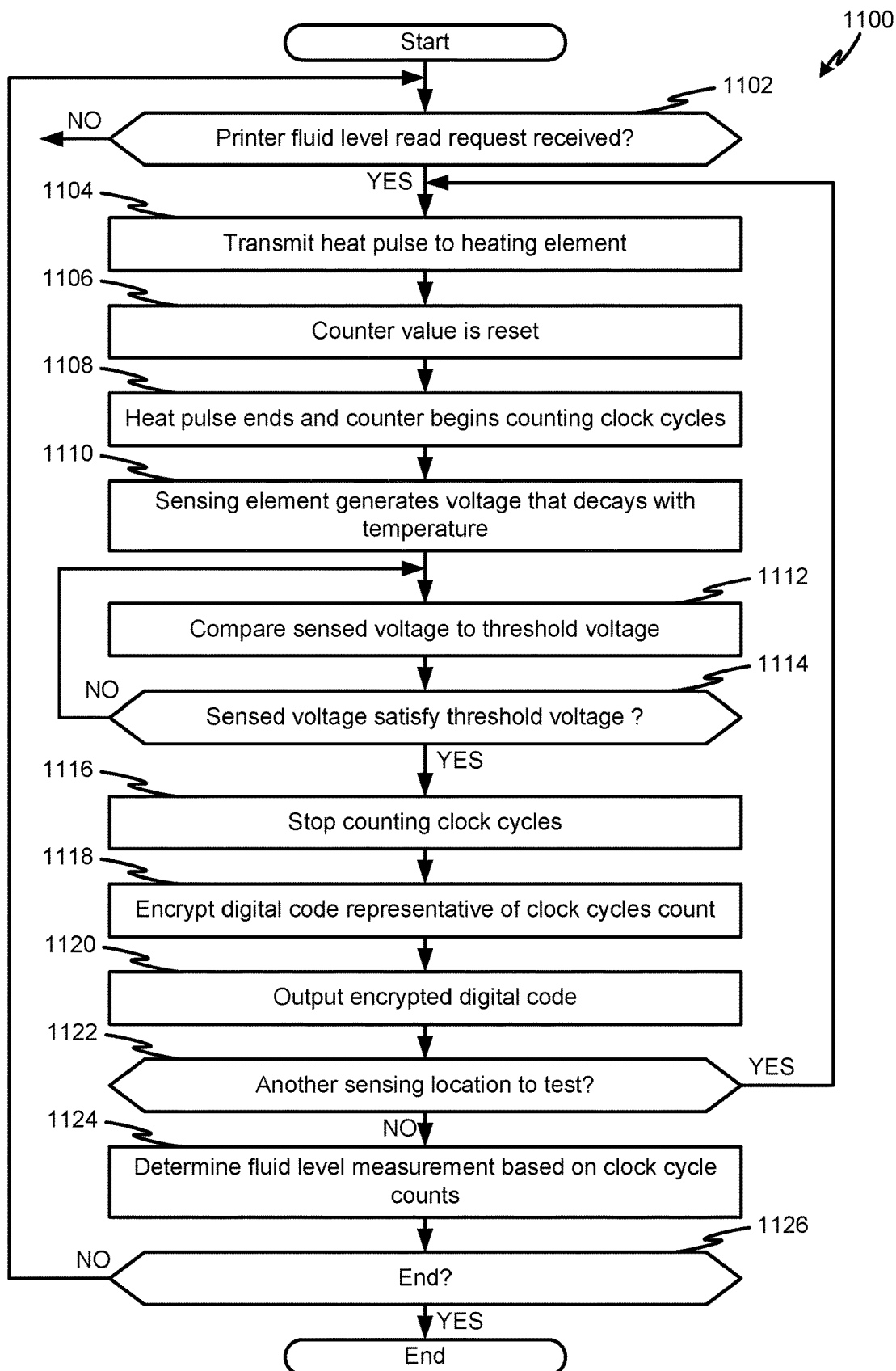

The process 1100 of FIG. 11 begins at block 1102 by determining whether a fluid level read request was received. For example, the electrical interface 150 may receive a fluid level read request in response to a command from a user, in response to a page count, etc. At block 1104, the process 1100 of FIG. 11 transmits a heat pulse to a selected sensing location 215 on the sensing die 155. For example, the electrical interface 150 may provide a sensing location (e.g., the third sensing location 215*c*) to the on-die controller 420, which then selects the third sensing location 215*c* by enabling the third element manager 445*c*. At block 1106, the process 1100 of FIG. 11 resets the counter 510. In some implementations, the process 1100 may not reset the counter 510. At block 1108, the heat pulse ends and a cooling period begins. The example counter 510 begins counting clock cycles at the start of the cooling period.

At block 1110, the third sensing element 435*c* associated with the third sensing location 215*c* detects the temperature of the sensing die 155 proximate to the third sensing location 215*c* and generates a sensed voltage 440 based on the detected temperature. At block 1112, the example voltage comparator 425 compares the sensed voltage 440 to the threshold voltage 460. In some implementations, the electrical interface 150 provides a fixed value to the voltage comparator 425. In some implementations, the electrical interface 150 varies the value of the threshold voltage 460 for different tests. If, at block 1114, the voltage comparator 425 determines that that sensed voltage 440 satisfies the threshold voltage 460 (e.g., the sensed voltage 440 is greater than or equal to the threshold voltage 460), then control returns to block 1112 to compare the sensed voltage 440 to the threshold voltage 460.

If, at block 1114, the voltage comparator 425 determines that the sensed voltage 440 does not satisfy the threshold voltage 460 (e.g., the sensed voltage 440 is less than the threshold voltage 460), then, at block 1116, the process 1100 of FIG. 11 stops counting clock cycles. For example, the example counter 510 may stop counting clock cycles when the comparator output 465 transitions from the logical high value to the logical low value. At block 1118, the process 1100 encrypts the example digital code 515 representative of the number of clock cycles counted by the counter 510. For example, the counter 510 may output the digital code 515 to the on-die controller 420, which may include an encryption chip (e.g., a TPM chip) to encrypt the digital code 515. At block 1120, the process 1100 outputs the encrypted digital code 515 from the sensing die 155 to the electrical interface 150.

At block 1122, the process 1100 determines whether there is another sensing location 215 to test. For example, the electrical interface 150 may test a portion of the sensing locations 215 and/or all of the sensing locations 215 included in the sensing die 155. If, at block 1122, the process 1100 determines that there is another sensing location 215 to test, then control returns to block 1104 to transmit a heat pulse to the selected sensing location 215.

If, at block 1122, the process 1100 determines that there is not another sensing location 215 to test, then, at block 1124, the process 1100 determines a fluid level measurement based on the recorded flipping times (e.g., the encrypted digital codes 515). For example, the electrical interface 150 may process the recorded flipping times and identify a location where the presence of a fluid (e.g., ink) transitions from proximate to not proximate based on a change in the recorded flipping times. At block 1126, the process 1100 of FIG. 11 determines whether to continue making fluid level measurements. If, at block 1126, the process 1100 of FIG. 11 determines to continue making fluid level measurements, control returns to block 1102 to determine whether a fluid level read request was received. Otherwise, the example process 1100 of FIG. 11 ends.

Figure 12:
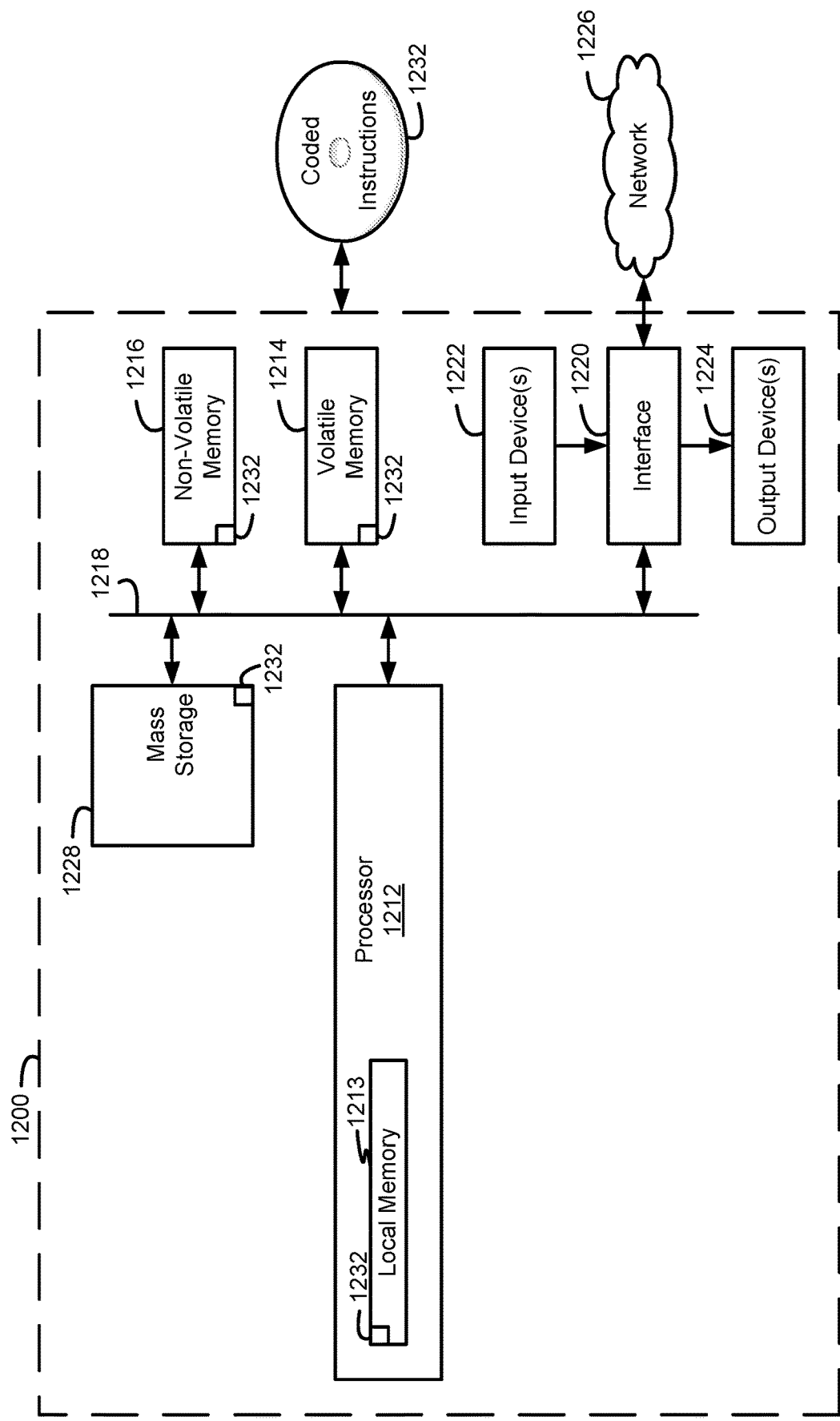
FIG. 12 is a block diagram of an example processor platform structured to execute machine-readable instructions to implement the processes of FIGS. 9, 10 and/or 11 to implement the example printing cartridges of FIGS. 1-5 and/or 13.

FIG. 12 is a block diagram of an example processor platform 1200 capable of executing machine-readable instructions to implement the processes of FIGS. 9, 10 and/or 11 and/or the printing system 100 of FIGS. 1-5 and/or 13. The processor platform 1200 can be, for example, a server, a personal computer, or any other type of computing device.

The processor platform 1200 of the illustrated example includes a processor 1212. The processor 1212 of the illustrated example is hardware. For example, the processor 1212 can be implemented by at least one of integrated circuits, logic circuits, microprocessors or controllers from any desired manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller. In some instances, the main memory may include the volatile memory 814 alone. In some instances, the main memory may include the non-volatile memory 816 alone.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, at least one input device 1222 is connected to the interface circuit 1220. The input device (s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 1224 is also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, may include a graphics driver card, a graphics driver chip or a graphics driver processor.

The interface circuit 1220 of the illustrated example may also include a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example may also include at least one mass storage device 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the processes of FIGS. 9, 10 and/or 11 may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture relate to printing cartridges and sensing fluid levels of the printing cartridges. Using examples disclosed herein, fluid level information is sensed at a plurality of sensing locations included in a sensing die. The sensing die is integrated with a fluid container and extends from the top of the fluid container to the bottom of the fluid container, or a portion of the fluid container. When a request to measure fluid levels is received, a heating event is initiated at a selected sensing location and a heat pulse is emitted by a heating element. A sensing element positioned at or near the sensing location detects the temperature of the sensing die and converts the temperature into a sensed voltage. A voltage comparator compares the sensed voltage to a threshold voltage and generates a continuous output indicative of whether the sensed voltage satisfies the threshold voltage. The continuous output generated by the voltage comparator is time-based information representing of a duration that the sensed voltage satisfies the threshold voltage. In some implementations, the threshold voltage is a fixed value that is applied to each tested sensing location. In some implementations, the threshold voltage is a variable that may change from one heating event to the next heating event.

Information from the sensing die is transmitted to the electrical interface, which then processes the received information to determine a location where presence of a fluid (e.g., ink) transitions from present to not present. In some implementations, the information received form the sensing die is time-based information. For example, the electrical interface may monitor the comparator output and record when the comparator output flips from a logical high state to a logical low state. In some implementations, the sensing die may include a counter to convert the time-based information output by the voltage comparator to a digital code representative of a number of clock cycles that the output of the voltage comparator stayed in the logical high state before flipping to the logical low state.

The disclosed methods, apparatus and articles of manufacture save print head cost by providing a simple method for capturing and communicating fluid levels in a fluid container. Furthermore, the disclosed methods, apparatus and articles of manufacture provide a simple communication protocol that reduces silicon area and costs associated with embedding silicon. The disclosed methods, apparatus and articles of manufacture also preserve the sensing elements and the heating elements via a passivation layer that protects the heating elements and the sensing elements associated with each sensing location 215 from damage that may occur from corrosive contact with the fluid (e.g., ink) being sensed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Although implementations for fluid level sensing apparatus and methods have been described in language specific to structural features, it is to be understood that the present subject matter is not limited to the specific features described. Rather, the specific features are disclosed and explained as example implementations for fluid level sensing apparatus and methods.

We claim:

1. A printing cartridge comprising:
a fluid container;
a plurality of sensing locations in thermal contact with the fluid container;
a voltage comparator to output time-based information based on a comparison of a sensed voltage generated at a selected sensing location of the plurality of sensing locations over time to a threshold voltage, the time-based information representative of a temperature decay and whether a fluid is present at a fluid level associated with the selected sensing location;
a counter to convert the time-based information to a digital code based on a number of clock cycles; and
an electrical interface to:
 map the digital code to a temperature decay rate; and
 determine whether fluid is present at the sensing location based on the temperature decay rate.

2. The printing cartridge of claim 1, wherein the counter is enabled based on the time-based information.

3. The printing cartridge of claim 1, further including a heating element to emit a heat pulse to be detected at a sensing location.

4. The printing cartridge of claim 3, wherein the counter is to reset the number of clock cycles in response to the heating element emitting the heat pulse.

5. The printing cartridge of claim 3, wherein the counter is to reset the number of clock cycles at the end of the heat pulse.

6. The printing cartridge of claim 3, wherein each of the sensing locations include a sensing element associated with a fluid level.

7. The printing cartridge of claim 6, wherein the sensing elements generate the sensed voltage based on a detected temperature at the selected sensing location.

8. The printing cartridge of claim 1, further including an oscillator to generate a clock signal.

9. The printing cartridge of claim 1, wherein the electrical interface is to provide a clock signal to the counter.

10. The printing cartridge of claim 1, wherein the electrical interface is to:
generate a signal based on the temperature decay rate associated with a sensing location; and
transmit the signal to a printer.

11. The printing cartridge of claim 1, wherein the electrical interface is to:
determine a duration of time for the output of the voltage comparator to flip from a first state of a second state; and
determine whether fluid is present at the selected sensing location based on the duration.

12. The printing cartridge of claim 11, wherein the duration is determined based on when an instruction to test the selected sensing location was provided.

13. The printing cartridge of claim 11, wherein the duration is determined based on when a heat pulse at the selected sensing location ends.

14. The printing cartridge of claim 1, wherein the selected sensing location is a first selected sensing location and the threshold voltage is a first threshold voltage for the first selected sensing location, and the voltage comparator is to use a second threshold voltage for a second selected sensing location, the second threshold voltage different than the first threshold voltage.

15. The printing cartridge of claim 1, wherein the selected sensing location is a first selected sensing location and the threshold voltage is a first threshold voltage for the first selected sensing location, and the voltage comparator is to use a second threshold voltage for a second selected sensing location, the second threshold voltage different than the first threshold voltage, and wherein the electrical interface is to:
 determine a duration of time for the output of the voltage comparator to flip from a first state of a second state;
 monitor respective temperature decay rates for at least a portion of the plurality of sensing locations;
 determine at least one of a location in the print cartridge of transition from a first fluid to a second fluid based on the respective temperature decay rates or whether fluid is present at the selected sensing location based on at least one of on the temperature decay rate or the duration;
 generate a signal based on the temperature decay rate associated with a sensing location; and
 transmit the signal to a printer.

16. The printing cartridge of claim 1, wherein the sensed voltage varies over time.

17. An apparatus comprising:
 a sensing die including:
  a plurality of sensing locations in thermal contact with a fluid container, each of the sensing locations associated with a fluid level in the fluid container, the plurality of sensing locations individually selectable; and
  a counter to convert time-based information to a digital code based on a number of clock cycles, the time-based information based on a comparison of a sensed voltage generated at a selected sensing location over time and a threshold voltage, the time-based information representative of a temperature decay rate and whether a fluid is present at the selected sensing location; and
 an electrical interface to:
  map the digital code to the temperature decay rate; and
  determine whether fluid is present at the sensing location based on the temperature decay rate.

18. The apparatus of claim 17, further including an oscillator to generate a clock signal.

19. A printing cartridge comprising:
 a fluid container;
 a sensing die in thermal contact with the fluid container, the sensing die to include a sensing element to generate a sensed voltage based on a detected temperature of the sensing die, the sensing element associated with a fluid level of the fluid container;
 a voltage comparator to output a first value when the sensed voltage satisfies a threshold voltage and to output a second value when the sensed voltage does not satisfy the threshold voltage;
 a counter to count a number of clock cycles while the output of the voltage is the first value; and
 an electrical interface to:
  map the number of clock cycles to a temperature decay rate; and
  determine whether fluid is present at the fluid level associated with the sensing element based on the temperature decay rate.

* * * * *